US012107350B2

(12) United States Patent
Lee et al.

(10) Patent No.: US 12,107,350 B2
(45) Date of Patent: Oct. 1, 2024

(54) ELECTRONIC DEVICE HAVING 5G ANTENNA

(71) Applicant: LG ELECTRONICS INC., Seoul (KR)

(72) Inventors: Songyi Lee, Seoul (KR); Moonsoo Song, Seoul (KR); Chisang You, Seoul (KR); Kyoungsun Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 210 days.

(21) Appl. No.: 17/773,020

(22) PCT Filed: Oct. 30, 2019

(86) PCT No.: PCT/KR2019/014410

§ 371 (c)(1),
(2) Date: Apr. 28, 2022

(87) PCT Pub. No.: WO2021/085665

PCT Pub. Date: May 6, 2021

(65) Prior Publication Data

US 2023/0039020 A1 Feb. 9, 2023

(51) Int. Cl.
*H01Q 1/24* (2006.01)
*H01Q 9/04* (2006.01)
(Continued)

(52) U.S. Cl.
CPC ............... *H01Q 9/26* (2013.01); *H01Q 1/243* (2013.01); *H01Q 9/0457* (2013.01); *H01Q 21/08* (2013.01)

(58) Field of Classification Search
CPC ........ H01Q 9/26; H01Q 1/243; H01Q 9/0457; H01Q 21/08; H01Q 1/38; H01Q 1/523;
(Continued)

(56) References Cited

U.S. PATENT DOCUMENTS 11,862,875 B2 * 1/2024 Magill ................. H01Q 9/0421
2019/0027838 A1 * 1/2019 Paulotto ............... H01Q 21/065
(Continued)

FOREIGN PATENT DOCUMENTS

EP 3460910 A1 * 3/2019
KR 20070060818 6/2007
(Continued)

OTHER PUBLICATIONS

Mohammed abu Saada et al., "Design of Efficient Microstrip Linear Antenna Array for 5G Communications Systems" 2017 International Conference on Promising Electronic Technologies, Oct. 2017, 8 pages.

(Continued)

*Primary Examiner* — David E Lotter

(74) *Attorney, Agent, or Firm* — LEE, HONG, DEGERMAN, KANG & WAIMEY

(57) ABSTRACT

An electronic device having a 5G antenna, according to the present invention, is provided. The electronic device comprises an antenna, which includes: a first metal pattern formed so that metal having a predetermined length and width is printed and arranged on the top of a substrate; a second metal pattern formed so that metal, which is spaced a predetermined distance from the first metal pattern and has a predetermined length and width, is printed and arranged; and a power feeding pattern formed so that a signal is coupling-fed to the first metal pattern and the second metal pattern.

13 Claims, 19 Drawing Sheets

(51) Int. Cl.
*H01Q 9/26* (2006.01)
*H01Q 21/08* (2006.01)

(58) Field of Classification Search
CPC ........ H01Q 5/40; H01Q 21/28; H01Q 9/0407; H01Q 21/06; H04B 7/06
USPC .......................................................... 343/702
See application file for complete search history.

(56) References Cited

U.S. PATENT DOCUMENTS

| | | | | |
|---|---|---|---|---|
| 2019/0165476 | A1 | 5/2019 | Hong et al. | |
| 2020/0194879 | A1* | 6/2020 | Lim | H01Q 1/243 |
| 2020/0328516 | A1* | 10/2020 | Kakuya | H01Q 9/0407 |
| 2021/0036433 | A1* | 2/2021 | Kim | H01Q 21/08 |
| 2021/0288401 | A1* | 9/2021 | Lee | H01Q 1/243 |
| 2022/0368013 | A1* | 11/2022 | Jung | H01Q 9/0421 |
| 2023/0025634 | A1* | 1/2023 | Kim | H04B 7/0617 |
| 2023/0307825 | A1* | 9/2023 | Seo | H01Q 1/42 |

FOREIGN PATENT DOCUMENTS

| | | |
|---|---|---|
| KR | 20130017274 | 2/2013 |
| KR | 20150118481 | 10/2015 |

OTHER PUBLICATIONS

PCT International Application No. PCT/KR2019/014410, International Search Report dated Aug. 27, 2020, 4 pages.

* cited by examiner (a)

(b)

(a)

(b)

(a)

(b)

(a)

(b)

(a)

(b)

ELECTRONIC DEVICE HAVING 5G ANTENNA

CROSS-REFERENCE TO RELATED APPLICATIONS

This application is the National Stage filing under 35 U.S.C. 371 of International Application No. PCT/KR2019/014410, filed on Oct. 30, 2019, the contents of which are all incorporated by reference herein in their entirety.

TECHNICAL FIELD

The present disclosure relates to an electronic device having a 5G antenna. One particular implementation relates to an electronic device having a low-profile antenna operating in a 5G Sub 6 band.

BACKGROUND ART

Electronic devices may be classified into mobile/portable terminals and stationary terminals according to mobility. Also, the electronic devices may be classified into handheld types and vehicle mount types according to whether or not a user can directly carry.

Functions of electronic devices are diversifying. Examples of such functions include data and voice communications, capturing images and video via a camera, recording audio, playing music files via a speaker system, and displaying images and video on a display. Some electronic devices include additional functionality which supports electronic game playing, while other terminals are configured as multimedia players. Specifically, in recent time, mobile terminals can receive broadcast and multicast signals to allow viewing of video or television programs As it becomes multifunctional, an electronic device can be allowed to capture still images or moving images, play music or video files, play games, receive broadcast and the like, so as to be implemented as an integrated multimedia player.

Efforts are ongoing to support and increase the functionality of electronic devices. Such efforts include software and hardware improvements, as well as changes and improvements in the structural components.

In addition to those attempts, the electronic devices provide various services in recent years by virtue of commercialization of wireless communication systems using an LTE communication technology. In the future, it is expected that a wireless communication system using a 5G communication technology will be commercialized to provide various services. Meanwhile, some of LTE frequency bands may be allocated to provide 5G communication services.

In this regard, the mobile terminal may be configured to provide 5G communication services in various frequency bands. Recently, attempts have been made to provide 5G communication services using a Sub-6 band under a 6 GHz band. In the future, it is also expected to provide 5G communication services by using a millimeter-wave (mmWave) band in addition to the Sub-6 band for a faster data rate.

Meanwhile, an antenna operating in a 5G Sub 6 band may be disposed on a side surface of an electronic device or inside the electronic device. In recent years, there is a tendency to adopt full displays in electronic devices such as mobile terminals. In addition to electronic devices having full displays, new form-factors in foldable, flexible, and rollable forms are emerging by the development of flexible displays.

Even in electronic devices according to such various form-factors, the number of antennas is increasing for fast data transmission. However, since the size and shape of antennas that can be disposed in an electronic device is limited, there are problems in view of a reduction of a design space and a difficulty in securing radiation efficiency.

DISCLOSURE OF INVENTION

Technical Problem

The present disclosure is directed to solving the aforementioned problems and other drawbacks. The present disclosure describes an electronic device in which a low-profile antenna with a small size and a high height is disposed.

The present disclosure also describes a low-profile antenna with high antenna space utilization and arrangement freedom while optimizing radio performance.

Solution to Problem

According to one aspect of the subject matter disclosed herein, an electronic device having an antenna may be provided. The electronic device may include an antenna that includes a first metal pattern formed by printing a metal having a predetermined length and width on an upper portion of a substrate, a second metal pattern spaced apart from the first metal pattern and formed by printing a metal having a predetermined length and width, and a feeding pattern configured to couple and feed signals to the first metal pattern and the second metal pattern.

In one implementation, the first metal pattern and the second metal pattern may include an inset region in which no metal pattern is formed. The feeding pattern may be disposed by printing a metal having a predetermined length and width in a region in which the first metal pattern and the second metal pattern are spaced apart from each other and the inset region.

In one implementation, the electronic device may further include a transceiver circuit connected to the feeding pattern and configured to transmit signals to the first metal pattern and the second metal pattern through the feeding pattern. Here, the transceiver circuit may be an integrated circuit such as an RFIC.

In one implementation, the antenna may further include a plurality of vias configured to connect the first and second metal patterns and a lower ground pattern at end portions of the first metal pattern and the second metal pattern. The plurality of vias may be spaced apart from one another by predetermined distances inward from terminated portions of the first metal pattern and the second metal pattern.

In one implementation, a horizontal magnetic field current may be generated in a horizontal plane with the first metal pattern and the second metal pattern in a boundary region between a boundary region of the feeding pattern and the inset region, and the horizontal magnetic field current may cause a height of a substrate on which the antenna is disposed to be reduced.

In one implementation, the first metal pattern and the second metal pattern may be disposed on an upper portion of a first substrate, and the antenna may further include a ground layer disposed on a lower portion of a second substrate to provide a reference electric potential for the antenna.

In one implementation, permittivity of the first substrate may be set to a value greater than permittivity of the second substrate to increase efficiency of the antenna and reduce a size of the antenna.

In one implementation, the feeding pattern may be disposed on the upper portion of the first substrate that is coplanar with the first metal pattern and the second metal pattern.

In one implementation, the feeding pattern may be disposed on a lower portion of the first substrate or an upper portion of the second substrate that is a different plane from the first metal pattern and the second metal pattern.

In one implementation, each of the first and second antennas may include a first radiation portion formed in a rectangular shape having a predetermined length and width, and having an inset region formed therein. Also, each of the first and second antennas may further include a second radiation portion connected to the first radiation portion and formed to be tapered at a predetermined angle to increase a width.

In one implementation, the feeding pattern may be disposed in the inset region inside the first radiation portion. A position at which the feeding pattern is disposed may be offset by a predetermined distance from an end portion in a width direction of the first radiation portion.

In one implementation, the electronic device may further include a carrier formed of a dielectric and disposed inside the electronic device. The antenna may be disposed on a front surface of the carrier and the first metal pattern and the second metal pattern may be disposed in a longitudinal direction of the electronic device.

In one implementation, a width of an end portion of the second radiation portion may be set to a value ranging from 8 to 12 mm in consideration of resonant frequency and radiation efficiency of the antenna.

In one implementation, a difference between widths of the first radiation portion and the second radiation portion at a point where the first radiation portion and the second radiation portion are connected may be set to a value ranging from 1 to 5 mm in consideration of impedance and resonant frequency of the antenna.

In one implementation, a length of the feeding pattern may be set to a value of 0.3 to 0.4 times a length from a terminated portion of the first metal pattern to a terminated portion of the second metal pattern in consideration of resonant frequency, bandwidth, and radiation efficiency of the antenna.

In one implementation, the electronic device may further include a first antenna disposed on a side surface portion of the electronic device and configured to operate in a first band that is an LTE band. Here, the antenna may be a second antenna configured to operate in a second band that is a 5G Sub 6 band.

In one implementation, the electronic device may further include a baseband processor connected to the transceiver circuit and configured to control the transceiver circuit to transmit and receive signals through at least one of the first antenna and the second antenna. Here, the baseband processor may be a modem that encodes and decodes information using corresponding signals.

In one implementation, the transceiver circuit may be configured to transmit and receive a first signal of the first band and transmit and receive a second signal of the second band.

In one implementation, the baseband processor may control the transceiver circuit to receive the second signal through the second antenna when quality of the first signal is lower than or equal to a threshold. In this case, the baseband processor may perform carrier aggregation (CA) by using the first signal of the first band received through the first antenna and the second signal of the second band received through the second antenna when broadband transmission is requested and a broadband frequency is allocated.

Advantageous Effects of Invention

The present disclosure can provide an electronic device in which a low-profile antenna with a small size and a low height is disposed even in a full display structure.

The present invention can also provide a low-profile antenna that can be disposed inside an electronic device to be horizontal to a cover of the electronic device, so as to secure high antenna space utilization and arrangement freedom while optimizing wireless performance.

In particular, the low-profile antenna can be effectively designed to have a very low height of 0.02λ or lower, and can easily implement impedance matching.

In particular, the low-profile antenna may have a radiator with both end portions shorted, which can be advantageous in view of arranging plural antennas by virtue of miniaturization of antennas and improvement of isolation between antennas.

Further scope of applicability of the present disclosure will become apparent from the following detailed description. It should be understood, however, that the detailed description and specific examples, such as the preferred implementation of the invention, are given by way of illustration only, since various changes and modifications within the spirit and scope of the invention will be apparent to those skilled in the art.

MODE FOR THE INVENTION

Figure 1A:
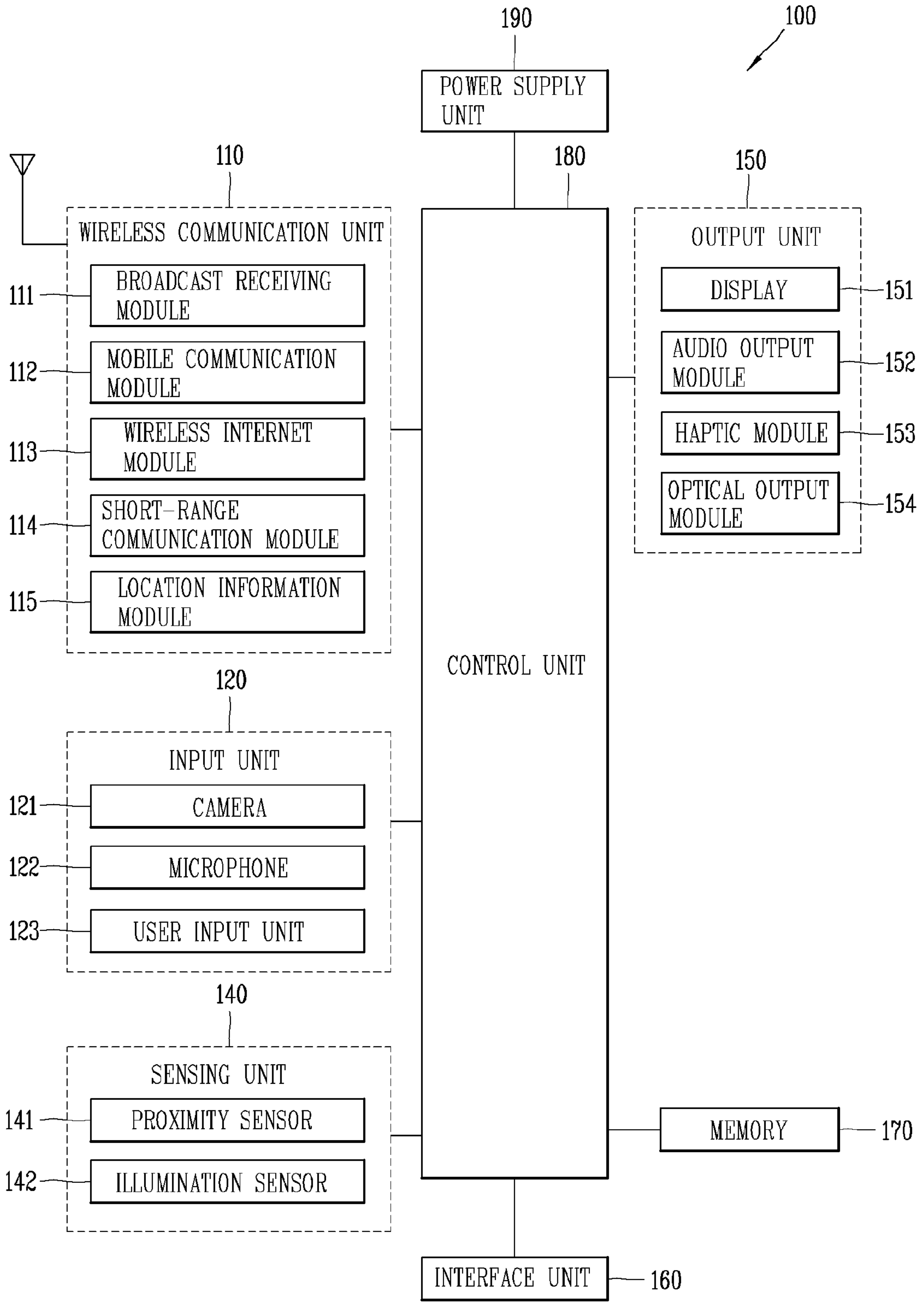
FIG. 1A is a block diagram of an electronic device in accordance with one implementation.

Description will now be given in detail according to exemplary implementations disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Electronic devices presented herein may be implemented using a variety of different types of terminals. Examples of such devices include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signages, and the like.

Figure 1B:
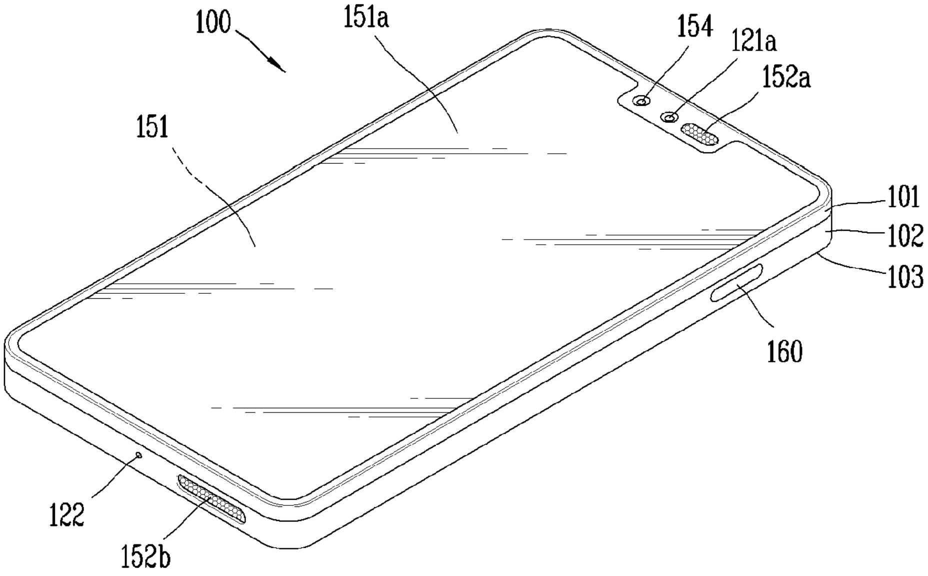
FIGS. 1B and 1C are conceptual views illustrating one example of the electronic device, viewed from different directions.
Figure 1C:
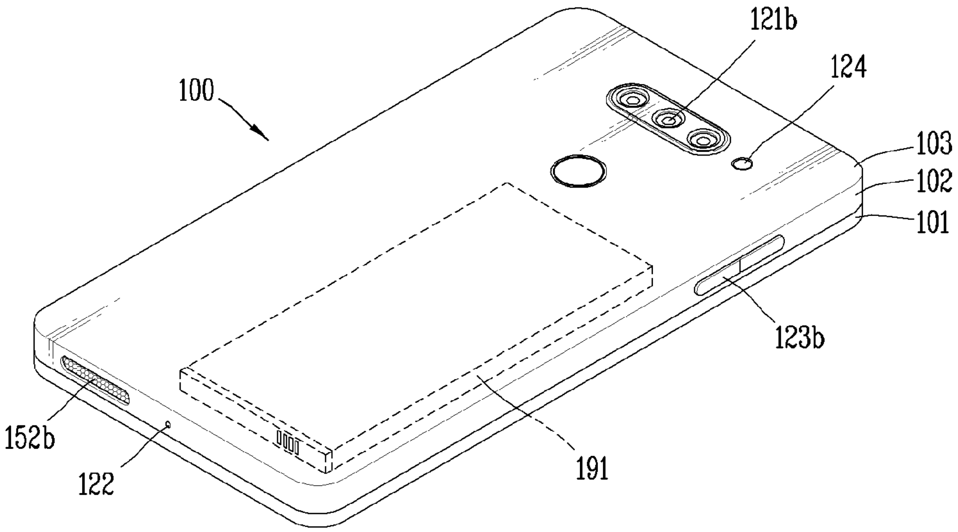

FIG. 1A is a block diagram of an electronic device in accordance with one implementation, and FIGS. 1B and 1C are conceptual views illustrating one example of the electronic device, viewed from different directions.

The electronic device 100 may be shown having components such as a wireless communication unit 110, an input unit 120, a sensing unit 140, an output unit 150, an interface unit 160, a memory 170, a controller 180, and a power supply unit 190. It is understood that implementing all of the illustrated components illustrated in FIG. 1A is not a requirement, and that greater or fewer components may alternatively be implemented.

In more detail, among others, the wireless communication unit 110 may typically include one or more modules which permit communications such as wireless communications between the electronic device 100 and a wireless communication system, communications between the electronic device 100 and another electronic device, or communications between the electronic device 100 and an external server. Further, the wireless communication unit 110 may typically include one or more modules which connect the electronic device 100 to one or more networks. Here, the one or more networks may be, for example, a 4G communication network and a 5G communication network.

The wireless communication unit 110 may include at least one of a 4G wireless communication module 111, a 5G wireless communication module 112, a short-range communication module 113, and a location information module 114.

The 4G wireless communication module 111 may perform transmission and reception of 4G signals with a 4G base station through a 4G mobile communication network. In this case, the 4G wireless communication module 111 may transmit at least one 4G transmission signal to the 4G base station. In addition, the 4G wireless communication module 111 may receive at least one 4G reception signal from the 4G base station.

In this regard, Uplink (UL) Multi-input and Multi-output (MIMO) may be performed by a plurality of 4G transmission signals transmitted to the 4G base station. In addition, Downlink (DL) MIMO may be performed by a plurality of 4G reception signals received from the 4G base station.

The 5G wireless communication module 112 may perform transmission and reception of 5G signals with a 5G base station through a 5G mobile communication network. Here, the 4G base station and the 5G base station may have a Non-Stand-Alone (NSA) structure. For example, the 4G base station and the 5G base station may be a co-located structure in which the stations are disposed at the same location in a cell. Alternatively, the 5G base station may be disposed in a Stand-Alone (SA) structure at a separate location from the 4G base station.

The 5G wireless communication module 112 may perform transmission and reception of 5G signals with a 5G base station through a 5G mobile communication network. In this case, the 5G wireless communication module 112 may transmit at least one 5G transmission signal to the 5G base station. In addition, the 5G wireless communication module 112 may receive at least one 5G reception signal from the 5G base station.

In this instance, 5G and 4G networks may use the same frequency band, and this may be referred to as LTE re-farming. In some examples, a Sub 6 frequency band, which is a range of 6 GHz or less, may be used as the 5G frequency band.

On the other hand, a millimeter-wave (mmWave) range may be used as the 5G frequency band to perform wideband high-speed communication. When the mmWave band is used, the electronic device 100 may perform beamforming for communication coverage expansion with a base station.

On the other hand, regardless of the 5G frequency band, 5G communication systems can support a larger number of multi-input multi-output (MIMO) to improve a transmission rate. In this instance, UL MIMO may be performed by a plurality of 5G transmission signals transmitted to a 5G base station. In addition, DL MIMO may be performed by a plurality of 5G reception signals received from the 5G base station.

On the other hand, the wireless communication unit 110 may be in a Dual Connectivity (DC) state with the 4G base station and the 5G base station through the 4G wireless communication module 111 and the 5G wireless communication module 112. As such, the dual connectivity with the 4G base station and the 5G base station may be referred to as EUTRAN NR DC (EN-DC). Here, EUTRAN is an abbreviated form of "Evolved Universal Telecommunication Radio Access Network", and refers to a 4G wireless communication system. Also, NR is an abbreviated form of "New Radio" and refers to a 5G wireless communication system.

On the other hand, if the 4G base station and 5G base station are disposed in a co-located structure, throughput improvement can be achieved by inter-Carrier Aggregation (inter-CA). Accordingly, when the 4G base station and the 5G base station are disposed in the EN-DC state, the 4G reception signal and the 5G reception signal may be simultaneously received through the 4G wireless communication module 111 and the 5G wireless communication module 112.

The short-range communication module 113 is configured to facilitate short-range communications. Suitable technologies for implementing such short-range communications include BLUETOOTHTM, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the electronic device 100 and a wireless communication system, communications between the electronic device 100 and another electronic device, or communications between the electronic device and a network where another electronic device (or an external server) is located, via wireless area network. One example of the wireless area networks is a wireless personal area network.

Short-range communication between electronic devices may be performed using the 4G wireless communication module 111 and the 5G wireless communication module 112. In one implementation, short-range communication may be performed between electronic devices in a device-to-device (D2D) manner without passing through base stations.

Meanwhile, for transmission rate improvement and communication system convergence, Carrier Aggregation (CA) may be carried out using at least one of the 4G wireless communication module 111 and the 5G wireless communication module 112 and a WiFi communication module. In this regard, 4G+WiFi CA may be performed using the 4G wireless communication module 111 and the Wi-Fi communication module 113. Or, 5G+WiFi CA may be performed using the 5G wireless communication module 112 and the Wi-Fi communication module 113.

The location information module 114 may be generally configured to detect, calculate, derive or otherwise identify a position (or current position) of the electronic device. As an example, the location information module 115 includes a Global Position System (GPS) module, a Wi-Fi module, or both. For example, when the electronic device uses a GPS module, a position of the electronic device may be acquired using a signal sent from a GPS satellite. As another example, when the electronic device uses the Wi-Fi module, a position of the electronic device can be acquired based on information related to a wireless Access Point (AP) which transmits or receives a wireless signal to or from the Wi-Fi module. If desired, the location information module 114 may alternatively or additionally function with any of the other modules of the wireless communication unit 110 to obtain data related to the position of the electronic device. The location information module 114 is a module used for acquiring the position (or the current position) and may not be limited to a module for directly calculating or acquiring the position of the electronic device.

Specifically, when the electronic device utilizes the 5G wireless communication module 112, the position of the electronic device may be acquired based on information related to the 5G base station which performs radio signal transmission or reception with the 5G wireless communication module. In particular, since the 5G base station of the mmWave band is deployed in a small cell having a narrow coverage, it is advantageous to acquire the position of the electronic device.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensor unit 140 may typically be implemented using one or more sensors configured to sense internal information of the electronic device, the surrounding environment of the electronic device, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The electronic device disclosed herein may be configured to utilize information obtained from one or more sensors, and combinations thereof.

The output unit 150 may typically be configured to output various types of information, such as audio, video, tactile output, and the like. The output unit 150 may be shown having at least one of a display 151, an audio output module 152, a haptic module 153, and an optical output module 154. The display 151 may have an inter-layered structure or an integrated structure with a touch sensor in order to implement a touch screen. The touch screen may function as the user input unit 123 which provides an input interface between the electronic device 100 and the user and simultaneously provide an output interface between the electronic device 100 and a user.

The interface unit 160 serves as an interface with various types of external devices that are coupled to the electronic device 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the electronic device 100 may perform assorted control functions associated with a connected external device, in response to the external device being connected to the interface unit 160.

The memory 170 is typically implemented to store data to support various functions or features of the electronic device 100. For instance, the memory 170 may be configured to store application programs executed in the electronic device 100, data or instructions for operations of the electronic device 100, and the like. Some of these application programs may be downloaded from an external server via wireless communication. Other application programs may be installed within the electronic device 100 at the time of manufacturing or shipping, which is typically the case for basic functions of the electronic device 100 (for example, receiving a call, placing a call, receiving a message, sending a message, and the like). It is common for application programs to be stored in the memory 170, installed in the electronic device 100, and executed by the controller 180 to perform an operation (or function) for the electronic device 100.

The controller 180 typically functions to control an overall operation of the electronic device 100, in addition to the operations associated with the application programs. The control unit 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1A, to execute an application program that have been stored in the memory 170. In addition, the controller 180 may control a combination of at least two of those components included in the electronic device 100 to activate the application program.

The power supply unit 190 may be configured to receive external power or provide internal power in order to supply appropriate power required for operating elements and components included in the electronic device 100. The power supply unit 190 may include a battery, and the battery may be configured to be embedded in the terminal body, or configured to be detachable from the terminal body.

At least part of the components may cooperably operate to implement an operation, a control or a control method of an electronic device according to various implementations disclosed herein. Also, the operation, the control or the control method of the electronic device may be implemented on the electronic device by an activation of at least one application program stored in the memory 170.

Referring to FIGS. 1B and 1C, the disclosed electronic device 100 includes a bar-like terminal body. However, the present disclosure may not be necessarily limited to this, and may be also applicable to various structures such as a watch type, a clip type, a glasses type, a folder type in which two or more bodies are coupled to each other in a relatively movable manner, a flip type, a slide type, a swing type, a swivel type, and the like. Discussion herein will often relate to a particular type of electronic device. However, such teachings with regard to a particular type of electronic device will generally be applied to other types of electronic devices as well.

Here, considering the electronic device 100 as at least one assembly, the terminal body may be understood as a conception referring to the assembly.

The electronic device 100 will generally include a case (for example, frame, housing, cover, and the like) forming the appearance of the terminal. In this embodiment, the electronic device 100 may include a front case 101 and a rear case 102. Various electronic components may be incorporated into a space formed between the front case 101 and the rear case 102. At least one middle case may be additionally positioned between the front case 101 and the rear case 102.

The display unit 151 is shown located on the front side of the terminal body to output information. As illustrated, a window 151*a* of the display unit 151 may be mounted to the front case 101 to form the front surface of the terminal body together with the front case 101.

In some embodiments, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted on the rear case 102 are exposed to the outside. Meanwhile, part of a side surface of the rear case 102 may be implemented to operate as a radiator.

As illustrated, when the rear cover 103 is coupled to the rear case 102, a side surface of the rear case 102 may partially be exposed. In some cases, upon the coupling, the rear case 102 may also be completely shielded by the rear cover 103. Meanwhile, the rear cover 103 may include an opening for externally exposing a camera 121*b* or an audio output module 152*b*.

The electronic device 100 may include a display unit 151, first and second audio output module 152*a* and 152*b*, a proximity sensor 141, an illumination sensor 142, an optical output module 154, first and second cameras 121*a* and 121*b*, first and second manipulation units 123*a* and 123*b*, a microphone 122, an interface unit 160, and the like.

The display 151 is generally configured to output information processed in the electronic device 100. For example, the display 151 may display execution screen information of an application program executing at the electronic device 100 or user interface (UI) and graphic user interface (GUI) information in response to the execution screen information.

The display 151 may be implemented using two display devices, according to the configuration type thereof. For instance, a plurality of the display units 151 may be arranged on one side, either spaced apart from each other, or these devices may be integrated, or these devices may be arranged on different surfaces.

The display unit 151 may include a touch sensor that senses a touch with respect to the display unit 151 so as to receive a control command in a touch manner. Accordingly, when a touch is applied to the display unit 151, the touch sensor may sense the touch, and a control unit 180 may generate a control command corresponding to the touch. Contents input in the touch manner may be characters, numbers, instructions in various modes, or a menu item that can be specified.

In this way, the display unit 151 may form a touch screen together with the touch sensor, and in this case, the touch screen may function as the user input unit (123, see FIG. 1A). In some cases, the touch screen may replace at least some of functions of a first manipulation unit 123*a*.

The first audio output module 152*a* may be implemented as a receiver for transmitting a call sound to a user's ear and the second audio output module 152*b* may be implemented as a loud speaker for outputting various alarm sounds or multimedia playback sounds.

The optical output module 154 may be configured to output light for indicating an event generation. Examples of such events may include a message reception, a call signal reception, a missed call, an alarm, a schedule alarm, an email reception, information reception through an application, and the like. When a user has checked a generated event, the control unit 180 may control the optical output module 154 to stop the light output.

The first camera 121*a* may process image frames such as still or moving images obtained by the image sensor in a capture mode or a video call mode. The processed image frames can then be displayed on the display unit 151 or stored in the memory 170.

The first and second manipulation units 123*a* and 123*b* are examples of the user input unit 123, which may be manipulated by a user to provide input to the electronic device 100. The first and second manipulation units 123*a* and 123*b* may also be commonly referred to as a manipulating portion. The first and second manipulation units 123*a* and 123*b* may employ any method if it is a tactile manner allowing the user to perform manipulation with a tactile feeling such as touch, push, scroll or the like. The first and second manipulation units 123*a* and 123*b* may also be manipulated through a proximity touch, a hovering touch, and the like, without a user's tactile feeling.

On the other hand, the electronic device 100 may include a finger scan sensor which scans a user's fingerprint. The controller 180 may use fingerprint information sensed by the finger scan sensor as an authentication means. The finger scan sensor may be installed in the display unit 151 or the user input unit 123.

The microphone 122 may be configured to receive the user's voice, other sounds, and the like. The microphone 122 may be provided at a plurality of places, and configured to receive stereo sounds.

The interface unit 160 may serve as a path allowing the electronic device 100 to interface with external devices. For example, the interface unit 160 may be at least one of a connection terminal for connecting to another device (for example, an earphone, an external speaker, or the like), a port for near field communication (for example, an Infrared DaAssociation (IrDA) port, a Bluetooth port, a wireless LAN port, and the like), or a power supply terminal for supplying power to the electronic device 100. The interface unit 160 may be implemented in the form of a socket for accommodating an external card, such as Subscriber Identification Module (SIM), User Identity Module (UIM), or a memory card for information storage.

The second camera 121*b* may be further mounted to the rear surface of the terminal body. The second camera 121*b* may have an image capturing direction, which is substantially opposite to the direction of the first camera unit 121*a*.

The second camera 121*b* may include a plurality of lenses arranged along at least one line. The plurality of lenses may be arranged in a matrix form. The cameras may be referred to as an 'array camera.' When the second camera 121*b* is implemented as the array camera, images may be captured in various manners using the plurality of lenses and images with better qualities may be obtained.

The flash 124 may be disposed adjacent to the second camera 121*b*. When an image of a subject is captured with the camera 121*b*, the flash 124 may illuminate the subject.

The second audio output module 152*b* may further be disposed on the terminal body. The second audio output module 152*b* may implement stereophonic sound functions in conjunction with the first audio output module 152*a*, and may be also used for implementing a speaker phone mode for call communication.

At least one antenna for wireless communication may be disposed on the terminal body. The antenna may be embedded in the terminal body or formed in the case. Meanwhile, a plurality of antennas connected to the 4G wireless communication module 111 and the 5G wireless communication module 112 may be arranged on a side surface of the terminal. Alternatively, an antenna may be formed in a form of film to be attached onto an inner surface of the rear cover 103 or a case including a conductive material may serve as an antenna.

Meanwhile, the plurality of antennas arranged on a side surface of the terminal may be implemented with four or more antennas to support MIMO. In addition, when the 5G wireless communication module 112 operates in a millimeter-wave (mmWave) band, as each of the plurality of antennas is implemented as an array antenna, a plurality of array antennas may be arranged in the electronic device.

The terminal body is provided with a power supply unit 190 (see FIG. 1A) for supplying power to the electronic device 100. The power supply unit 190 may include a batter 191 which is mounted in the terminal body or detachably coupled to an outside of the terminal body.

Hereinafter, description will be given of embodiments of a multi-transmission system and an electronic device having the same, specifically, an electronic device operating in a heterogeneous radio system, with reference to the accompanying drawings. It will be apparent to those skilled in the art that the present disclosure may be embodied in other specific forms without departing from the idea or essential characteristics thereof.

Hereinafter, embodiments related to an antenna device having such configuration and a mobile terminal having the antenna device will be described with reference to the accompanying drawings. It will be apparent to those skilled in the art that the present disclosure may be embodied in other specific forms without departing from the idea or essential characteristics thereof.

First, FIG. 2 is an exploded perspective view of a mobile terminal according to one embodiment of the present invention. Referring to FIG. 2, the mobile terminal includes a window 210*a* and a display module 210*b*, which constitute the display unit 210. The window 210*a* may be coupled to one surface of the front case 201. The window 210*a* and the display module 210*b* may be integrally formed with each other.

A frame 260 is formed between the front case 201 and the rear case 202 to support electric elements. In this regard, when the front case 201 and the rear case 202 are made of a metal, they may be referred to as a metal frame. However, the example in which the front case 201 is the metal frame 201 is disclosed for the sake of explanation, but the present invention is not limited to this. Alternatively, at least one of the front case 201 and the rear case 202 may be realized as a metal frame made of a metal material. On the other hand, at least part of the side surface of the metal frame 201 may operate as an antenna.

The frame 260 is a support structure inside the terminal. As one example, the frame 260 may support at least one of the display module 210*b*, the camera module 221, an antenna device, a battery 240 or a circuit board 250.

A part of the frame 260 may be exposed to the outside of the terminal. Also, the frame 260 may constitute a part of a sliding module that connects the main body and the display unit to each other in a slide type terminal, not a bar type.

FIG. 2 shows one example in which the circuit board 250 is disposed between the frame 260 and the rear case 202 and the display module 210*b* is coupled to one surface of the frame 260. The circuit board 250 and the battery may be disposed on another surface of the frame 260 and a battery cover 203 may be coupled to the rear case 202 to cover the battery.

The window 210*a* is coupled to one surface of the front case 201. A touch detecting pattern 210*c* for detecting a touch may be formed on one surface of the window 210*a*. The touch detecting pattern 210*c* is configured to detect a touch input, and is made to be light-transmissive. The touch detecting pattern 210*c* may be mounted on the front surface of the window 210*a* and may be configured to convert a change in voltage or the like generated in a specific portion of the window 210*a* into an electrical input signal.

The display module 210*b* is mounted on a rear surface of the window 210*a*. This embodiment exemplarily illustrates that the display module 210*b* is a thin film transistor-liquid crystal display (TFT LCD), but the present invention is not limited thereto.

For example, the display module 210*b* may be a liquid crystal display (LCD), an organic light-emitting diode (OLED), a flexible display, a three-dimensional display, and the like.

As described above, the circuit board 250 may be provided on one surface of the frame 260, but may alternatively be mounted on the lower portion of the display module 210*b*. At least one electronic element is mounted on a lower surface of the circuit board 250.

The frame 260 is provided with an accommodating portion formed in a recessed shape such that the battery 240 can be accommodated therein. A contact terminal connected to the circuit board 250 may be provided on one surface of the battery accommodating portion so that the battery 240 can supply power to the terminal body.

The frame 260 may be formed of a metal material to maintain sufficient rigidity even if the frame 260 is formed to have a small thickness. The metal frame 260 may operate as a ground. That is, the circuit board 250 or the antenna device may be grounded to the frame 260, and the frame 260 may operate as the ground of the circuit board 250 or the antenna device. In this case, the frame 260 may extend the ground of the mobile terminal.

The circuit board 250 is electrically connected to the antenna device and is configured to process radio signals (or radio electromagnetic waves) transmitted and received through the antenna device. For the processing of the radio signals, a plurality of transceiver circuits may be formed or mounted on the circuit board 250.

The transceiver circuits may include one or more integrated circuits and associated electrical components. In one example, the transceiver circuits may include a transmission integrated circuit, a reception integrated circuit, a switching circuit, an amplifier, and the like.

The plurality of transceiver circuits may simultaneously feed conductive members with a conductive pattern that is an emitter, so that a plurality of antenna devices can operate simultaneously. For example, while one antenna performs transmission, another one may perform reception, or both of them may perform transmission or reception.

A coaxial cable may be provided to connect the circuit board and each antenna device to each other. In one example, the coaxial cable may be connected to feeders that feed the antenna devices. The feeders may be provided on one surface of a flexible circuit board 242 which processes signals input from the manipulation unit 123*a*. Another surface of the flexible printed circuit board 242 may be coupled to a signal transfer unit which is configured to transmit a signal of the manipulation unit 123*a*. In this case, a dome may be formed on the another surface of the flexible printed circuit board 242, and an actuator may be provided on the signal transfer unit.

The flexible printed circuit board 242 may be connected to a lower portion of a carrier 135. One end of the flexible circuit board 242 may be connected to the circuit board 250 which is provided with a controller. A carrier 136 may be disposed in a side surface of the electronic device rather than in a lower portion of the electronic device. The carrier 136 may be connected to the flexible printed circuit board or the circuit board 250. The flexible printed circuit board 242 or the circuit board 250 may be connected to a manipulation unit of the terminal. In this case, the flexible printed circuit board 242 may be configured such that a signal generated by the manipulation unit is transmitted to the controller of the circuit board 250.

Meanwhile, the present disclosure may consider an electronic device in which at least portions of the side surfaces of the metal frame 201 or a plurality of conductive patterns therein operate as antennas. In this regard, the plurality of conductive patterns inside the metal frame 201 may operate as a plurality of antenna elements.

In the configuration disclosed herein, when implementing a 5G Sub 6 antenna, the outer metal frame 201, that is, a metal decoration, may be used as the ground (GND) of two antennas of the same frequency. Each of the two antenna patterns connected to the metal decoration may be a main radiator.

Accordingly, the metal decoration corresponding to the outer metal frame 201 may be a ground, and become a common ground of the plurality of antennas. In addition, there may exist an antenna pattern, that is, a conductive pattern, in contact with the metal decoration and the conductive pattern may serve as a main radiator.

Hereinafter, a low-profile antenna that can be disposed inside the electronic device other than on the side surface of the electronic device will be described. Since the existing antennas are already disposed on the side surfaces of the electronic device, a space for arranging a plurality of antennas which can operate in the 5G Sub 6 band may be insufficient or interference with other antennas may occur. In order to solve this problem, the low-profile antenna may be implemented to be small in size and low in height inside the electronic device.

The present disclosure also provides an antenna miniaturization design technology for applying MIMO of 4×4 or higher. Specifically, the present disclosure proposes a method for optimally arranging a 5G sub-6 GHz antenna in a low-profile antenna structure implemented with a small size and low height inside an electronic device.

Figure 2A:
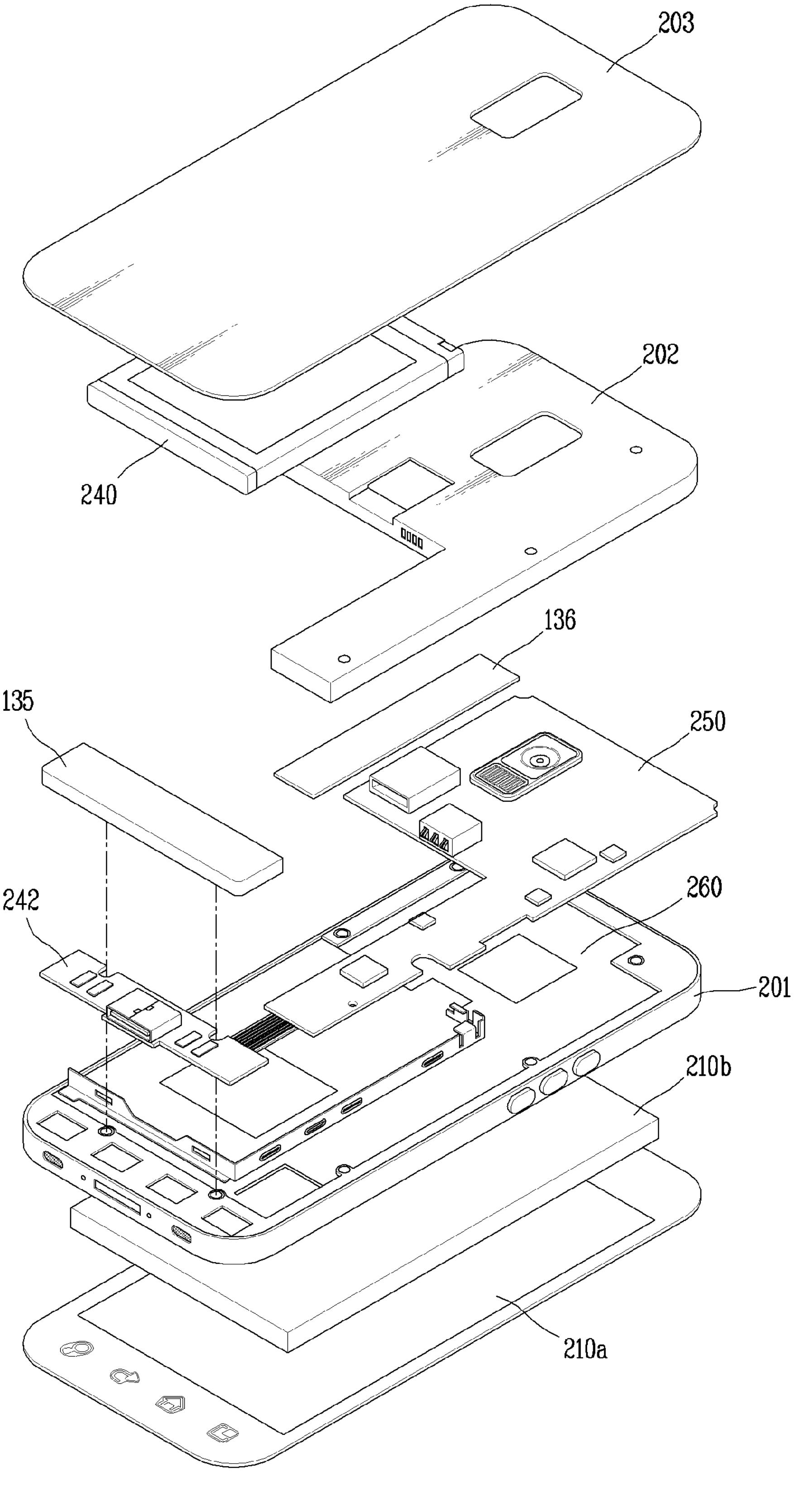
FIG. 2A is an exploded perspective view illustrating a mobile terminal in accordance with one implementation.
Figure 2B:
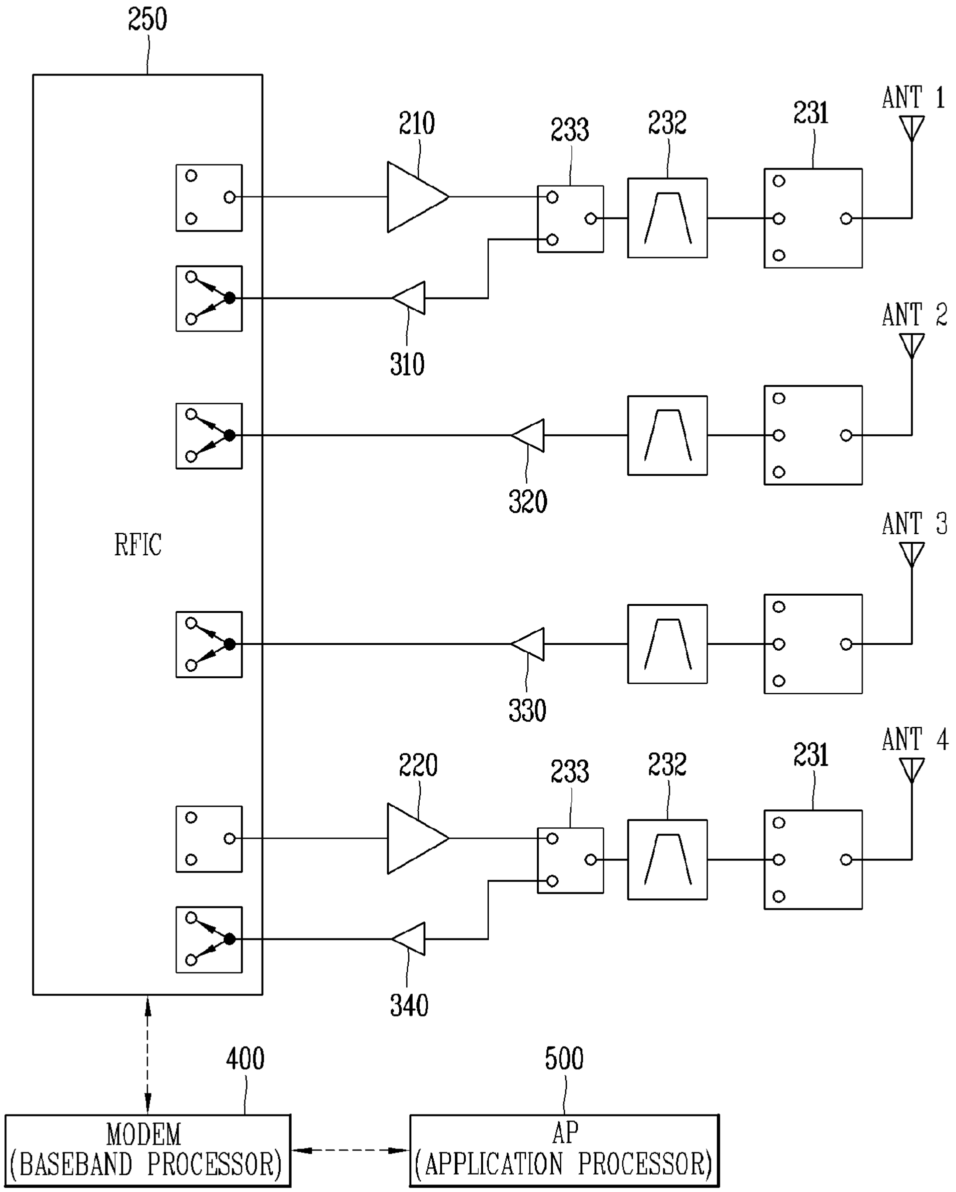
FIG. 2B is a block diagram illustrating an exemplary configuration of a wireless communication unit of an electronic device that can operate in a plurality of wireless communication systems.

FIG. 2B is a block diagram illustrating an exemplary configuration of a wireless communication unit of an electronic device that can operate in a plurality of wireless communication systems. Referring to FIG. 2B, the electronic device may include a first power amplifier 210, a second power amplifier 220, and an RFIC 250. In addition, the electronic device may further include a modem 400 and an application processor (AP) 500. Here, the modem 400 and the application processor (AP) 500 may be physically implemented on a single chip, and may be implemented in a logically and functionally separated form. However, the present disclosure may not be limited thereto and may be implemented in the form of a chip that is physically separated according to an application.

Meanwhile, the electronic device may include a plurality of low noise amplifiers (LNAs) 410 to 440 in the receiver. Here, the first power amplifier 210, the second power amplifier 220, the RFIC 250, and the plurality of low noise amplifiers 310 to 340 are all operable in a first communication system and a second communication system. In this case, the first communication system and the second communication system may be a 4G communication system and a 5G communication system, respectively.

As illustrated in FIG. 2, the RFIC 250 may be configured as a 4G/5G integrated type, but the present disclosure may not be limited thereto. The RFIC 250 may be configured as a 4G/5G separate type according to an application. When the RFIC 250 is configured as the 4G/5G integrated type, it may be advantageous in terms of synchronization between 4G and 5G circuits, and simplification of control signaling by the modem 400.

On the other hand, when the RFIC 250 is configured as the 4G/5G separate type, it may be referred to as a 4G RFIC and a 5G RFIC, respectively. In particular, when there is a great band difference between the 5G band and the 4G band, such as when the 5G band is configured as a millimeter wave band, the RFIC 250 may be configured as a 4G/5G separated type. As such, when the RFIC 250 is configured as the 4G/5G separate type, there may be an advantage that the RF characteristics can be optimized for each of the 4G band and the 5G band.

Meanwhile, even when the RFIC 250 is configured as a 4G/5G separation type, the 4G RFIC and the 5G RFIC may be logically and functionally separated but physically implemented on a single chip.

On the other hand, the application processor (AP) 500 may be configured to control the operation of each component of the electronic device. Specifically, the application processor (AP) 500 may control the operation of each component of the electronic device through the modem 400.

For example, the modem 400 may be controlled through a power management IC (PMIC) for low power operation of the electronic device. Accordingly, the modem 400 may operate power circuits of a transmitter and a receiver through the RFIC 250 in a low power mode.

In this regard, when it is determined that the electronic device is in an idle mode, the application processor (AP) 500 may control the RFIC 250 through the modem 300 as follows. For example, when the electronic device is in an idle mode, the application processor 280 may control the RFIC 250 through the modem 400, such that at least one of the first and second power amplifiers 110 and 120 operates in the low power mode or is turned off.

According to another embodiment, the application processor (AP) 500 may control the modem 400 to provide wireless communication capable of performing low power communication when the electronic device is in a low battery mode. For example, when the electronic device is connected to a plurality of entities among a 4G base station, a 5G base station, and an access point, the application processor (AP) 500 may control the modem 400 to enable wireless communication at the lowest power. Accordingly, even though a throughput is slightly sacrificed, the application processor (AP) 500 may control the modem 400 and the RFIC 250 to perform short-range communication using only the short-range communication module 113.

According to another implementation, when a remaining battery capacity of the electronic device is equal to or greater than a threshold value, the application processor 1450 may control the modem 300 to select an optimal wireless interface. For example, the application processor (AP) 500 may control the modem 400 to receive data through both the 4G base station and the 5G base station according to the remaining battery capacity and the available radio resource information. In this case, the application processor (AP) 500 may receive the remaining battery capacity information from the PMIC and the available radio resource information from the modem 400. Accordingly, when the remaining battery capacity and the available radio resources are sufficient, the application processor (AP) 500 may control the modem 400 and the RFIC 250 to receive data through both the 4G base station and 5G base station.

Meanwhile, in a multi-transceiving system of FIG. 2, a transmitter and a receiver of each radio system may be integrated into a single transceiver. Accordingly, a circuit portion for integrating two types of system signals may be removed from an RF front-end.

Furthermore, since the front end parts can be controlled by an integrated transceiver, the front end parts may be more efficiently integrated than when the transceiving system is separated by communication systems.

In addition, when separated for each communication system, different communication systems cannot be controlled as needed, or because this may lead to a system delay, resources cannot be efficiently allocated. On the other hand, in the multi-transceiving system as illustrated in FIG. 2, different communication systems can be controlled as needed, system delay can be minimized, and resources can be efficiently allocated.

Meanwhile, the first power amplifier 210 and the second power amplifier 220 may operate in at least one of the first and second communication systems. In this regard, when the 5G communication system operates in a 4G band or a Sub 6 band, the first and second power amplifiers 1210 and 220 can operate in both the first and second communication systems.

On the other hand, when the 5G communication system operates in a millimeter wave (mmWave) band, one of the first and second power amplifiers 210 and 220 may operate in the 4G band and the other in the millimeter-wave band.

On the other hand, two different wireless communication systems may be implemented in one antenna by integrating a transceiver and a receiver to implement a two-way antenna. In this case, 4×4 MIMO may be implemented using four antennas as illustrated in FIG. 2. At this time, 4×4 DL MIMO may be performed through downlink (DL).

Meanwhile, when the 5G band is a Sub 6 band, first to fourth antennas ANT1 to ANT4 may be configured to operate in both the 4G band and the 5G band. On the contrary, when the 5G band is a millimeter wave (mmWave) band, the first to fourth antennas ANT1 to ANT4 may be configured to operate in one of the 4G band and the 5G band. In this case, when the 5G band is the millimeter wave (mmWave) band, each of the plurality of antennas may be configured as an array antenna in the millimeter wave band.

Meanwhile, 2×2 MIMO may be implemented using two antennas connected to the first power amplifier 210 and the second power amplifier 220 among the four antennas. At this time, 2×2 UL MIMO (2 Tx) may be performed through uplink (UL). Alternatively, the present disclosure is not limited to 2×2 UL MIMO, and may also be implemented as 1 Tx or 4 Tx. In this case, when the 5G communication system is implemented by 1 Tx, only one of the first and second power amplifiers 210 and 220 need to operate in the 5G band. Meanwhile, when the 5G communication system is implemented by 4 Tx, an additional power amplifier operating in the 5G band may be further provided. Alternatively, a transmission signal may be branched in each of one or two transmission paths, and the branched transmission signal may be connected to a plurality of antennas.

On the other hand, a switch-type splitter or power divider is embedded in RFIC corresponding to the RFIC 250. Accordingly, a separate component does not need to be placed outside, thereby improving component mounting performance. In detail, a transmitter (TX) of two different communication systems can be selected by using a single pole double throw (SPDT) type switch provided in the RFIC corresponding to the controller.

In addition, the electronic device that is operable in the plurality of wireless communication systems according to an embodiment may further include a duplexer 231, a filter 232, and a switch 233.

The duplexer 231 may be configured to separate a signal in a transmission band and a signal in a reception band from each other. In this case, the signal in the transmission band transmitted through the first and second power amplifiers 210 and 220 may be applied to the antennas ANT1 and ANT4 through a first output port of the duplexer 231. On the contrary, signals in a reception band received through the antennas ANT1 and ANT4 are received by the low noise amplifiers 310 and 340 through a second output port of the duplexer 231.

The filter 232 may be configured to pass a signal in a transmission band or a reception band and to block a signal in a remaining band. In this case, the filter 232 may include a transmission filter connected to the first output port of the duplexer 231 and a reception filter connected to the second output port of the duplexer 231. Alternatively, the filter 232 may be configured to pass only the signal in the transmission band or only the signal in the reception band according to a control signal.

The switch 233 may be configured to transmit only one of a transmission signal and a reception signal. In an implementation of the present disclosure, the switch 233 may be configured in a single-pole double-throw (SPDT) form to separate the transmission signal and the reception signal in a time division duplex (TDD) scheme. In this case, the transmission signal and the reception signal may be in the same frequency band, and thus the duplexer 231 may be implemented in a form of a circulator.

Meanwhile, in another implementation of the present disclosure, the switch 233 may also be applied to a frequency division multiplex (FDD) scheme. In this case, the switch 233 may be configured in the form of a double-pole double-throw (DPDT) to connect or block a transmission signal and a reception signal, respectively. On the other hand, since the transmission signal and the reception signal can be separated by the duplexer 231, the switch 233 may not be necessarily required.

Meanwhile, the electronic device according to the present disclosure may further include a modem 400 corresponding to the controller. In this case, the RFIC 250 and the modem 400 may be referred to as a first controller (or a first processor) and a second controller (a second processor), respectively. On the other hand, the RFIC 250 and the modem 400 may be implemented as physically separated circuits. Alternatively, the RFIC 250 and the modem 400 may be logically or functionally distinguished from each other on one physical circuit.

The modem 400 may perform controlling of signal transmission and reception and processing of signals through different communication systems using the RFID 250. The modem 400 may acquire control information from a 4G base station and/or a 5G base station. Here, the control information may be received through a physical downlink control channel (PDCCH), but may not be limited thereto.

The modem 400 may control the RFIC 250 to transmit and/or receive signals through the first communication system and/or the second communication system for a specific time interval and from frequency resources. Accordingly, the RFIC 250 may control transmission circuits including the first and second power amplifiers 210 and 220 to transmit a 4G signal or a 5G signal in the specific time interval. In addition, the RFIC 250 may control reception circuits including the first to fourth low noise amplifiers 310 to 340 to receive a 4G signal or a 5G signal at a specific time interval.

Hereinafter, a low-profile antenna that can be disposed inside an electronic device according to the present disclosure will be described. Here, the term "low-profile" means that it is formed to have a low height and can be disposed inside the electronic device.

An antenna operating in a 5G Sub 6 band may be disposed on a side surface of an electronic device or inside the electronic device. In recent years, there is a tendency to adopt full displays in an electronic device such as a mobile terminal. In addition to electronic devices having full displays, new form-factors in foldable, flexible, and rollable forms are emerging by the development of flexible displays.

Even in electronic devices according to such various form-factors, the number of antennas is increasing for fast data transmission. However, since the size and shape of antennas that can be disposed in an electronic device is limited, there are problems in view of a reduction of a design space and a difficulty in securing radiation efficiency.

In order to solve these problems, the present disclosure provides a low-profile antenna that can be disposed inside full displays or electronic devices of various form-factors. Accordingly, the present disclosure describes an electronic device in which a low-profile antenna with a small size and a high height is disposed. The present disclosure also describes a low-profile antenna with high antenna space utilization and arrangement freedom while optimizing radio performance.

The present disclosure further describes an antenna capable of being disposed inside an electronic device, rather than on a lateral edge of the electronic device, which is a region on which existing antennas are concentrated. The present disclosure further describes an effective design of a low-profile antenna which has a low height to be disposed inside a cover of an electronic device in parallel to the cover.

In this regard, the low-profile antenna may be disposed on the carrier 136, with reference to FIG. 2A. In one example, the carrier 136 on which the low-profile antenna is arranged may be disposed in the longitudinal direction of the electronic device. When the low-profile antenna is disposed in the longitudinal direction of the electronic device, MIMO may be implemented by arranging a plurality of low-profile antennas in plural.

Meanwhile, the low-profile antenna that may be disposed inside the electronic device may be an antenna operating in the 5G Sub 6 band. However, the present disclosure may not be limited thereto, and the low-profile antenna may be an antenna operating in an LTE band according to an application.

Figure 3A:
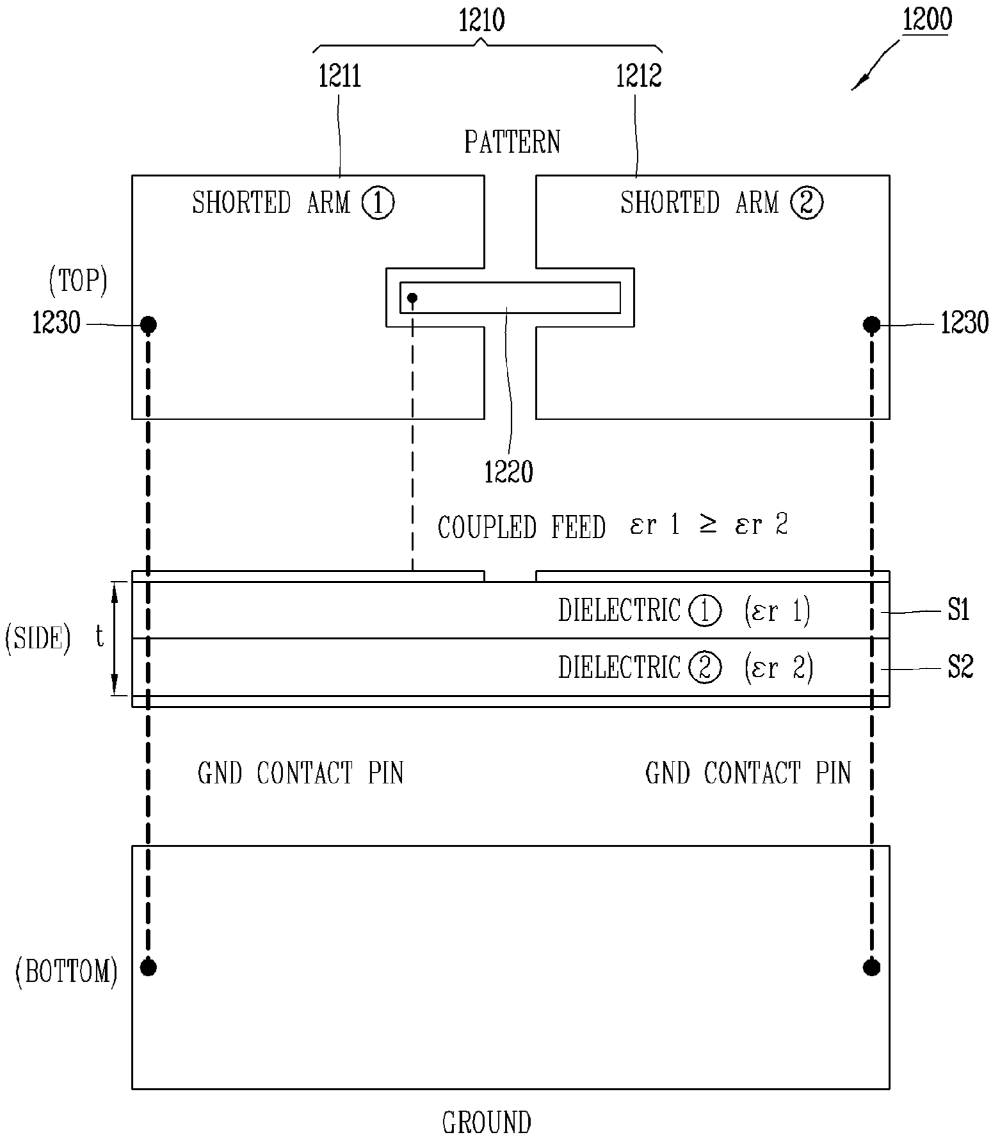
FIG. 3A is a view illustrating a top, side, and bottom of a substrate on which a low-profile antenna according to the present disclosure is implemented.
Figure 3B:
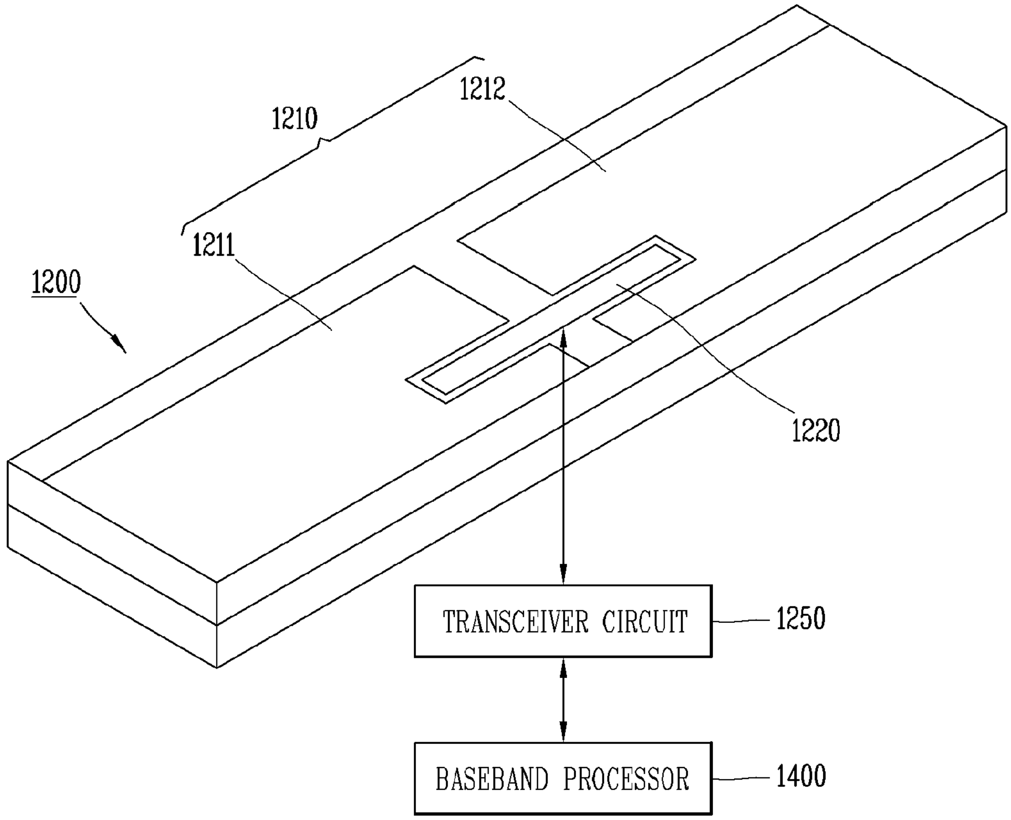
FIG. 3B is a view illustrating the low-profile antenna and a transceiver circuit for transmitting and receiving signals through the antenna.

FIG. 3A is a view illustrating a top, side, and bottom of a substrate on which a low-profile antenna according to the present disclosure is implemented. FIG. 3B is a view illustrating the low-profile antenna and a transceiver circuit for transmitting and receiving signals through the antenna. Technical features of the low-profile antenna may be described as follows.

1) Open surfaces of two metal patterns each with one end shorted are disposed to face each other at a distance from each other. The biggest structural feature is that feeding is made by indirect coupling in the same layer or different layers between the two metal patterns. By adjusting the distance, impedance matching can be easily performed.

2) The metal pattern and the ground have a low height therebetween and dielectric or air is filled between them. An antenna size can be reduced and radiation efficiency can be enhanced by stacking two or more different dielectrics.

3) A horizontal magnetic field current is generated by a vertical current flowing through a vertical connection portion connecting the metal pattern and the ground and a vertical electric field generated between the metal pattern and the ground. This horizontal magnetic field current is very efficient at a low antenna height according to an image theory.

Here, the low-profile antenna may be referred to as an ultra-miniaturized antenna. In this regard, the term "ultra-miniaturized antenna" means that a plurality of antenna elements can be arranged inside the electronic device by reducing length and width of the substrate where the antenna patterns are disposed.

An antenna according to the present disclosure may be characterized in that two patterns (Shorted arms ① and ②) each with one end shorted are disposed to face each other at a distance therebetween, and feeding is made by indirect coupling between the patterns.

This structure can induce effective radiation of the antenna at a low height t. In this regard, a horizontal magnetic field current is generated by a vertical current flowing through a vertical connection portion connecting the metal pattern and the ground and a vertical electric field generated between the metal pattern and the ground. This horizontal magnetic field current is very efficient at a low antenna height according to an image theory.

Specifically, referring to FIGS. 3A and 3B, the electronic device may include an antenna 1200, a transceiver circuit 1250, and a baseband processor 1400. Here, the transceiver circuit 1250 may be an RFIC that is an integrated circuit operating in an RF band. Also, the baseband processor 1400 may be a modem operating in a baseband. In this case, the RFIC may include a down-converter for converting an RF band signal into a baseband signal and an up-converter for converting a baseband signal into an RF band signal. The transceiver circuit 1250 corresponding to the RFIC and the baseband processor 1400 corresponding to the modem may be disposed in one chip to be implemented as a Soc (System On Chip).

The antenna 1200 may include a first metal pattern 1211, a second metal pattern 1212, and a feeding pattern 1220. The first metal pattern 1211 may be configured such that a metal having a predetermined length and width is printed on an upper portion of the substrate. The second metal pattern 1212 may be spaced apart from the first metal pattern 1211 by a predetermined distance, and may be configured such that a metal having a predetermined length and width is printed. Each of the first metal pattern 1211 and the second metal pattern 1212 may have an inset region in which a metal pattern is not formed.

Here, the term "inset region" means a region removed from a metal region of each of the first metal pattern 1211 and the second metal pattern 1212 like rectangular patches. A space for arranging the feeding pattern 1220 can be secured by the "inset region". In addition, impedance matching between the first metal pattern 1211 and the second metal pattern 1212 and the feeding pattern 1220 can be easily implemented through the "inset region" without a separate impedance matching circuit.

The feeding pattern 1220 may be configured such that a metal having a predetermined length and width is printed in a region where the first metal pattern 1211 and the second metal pattern 1212 are spaced apart from each other and the inset region. Accordingly, the feeding pattern 1220 can perform coupling feeding for signals to the first metal pattern 1211 and the second metal pattern 1212.

A position of a feeder at which the feeding pattern 1220 is connected to the transceiver circuit 1250 may be spaced apart from the center of the feeding pattern 1220 by a predetermined distance. As the feeding pattern 1220 is spaced apart by a predetermined distance, impedance matching can be facilitated and bandwidth characteristics can be optimized. On the other hand, a threshold that the position of the feeder is spaced apart from the center of the feeding pattern 1220 by the predetermined distance may be set to a degree to allow asymmetry of the radiation pattern of the antenna.

The transceiver circuit 1250 may be connected to the feeding pattern 1220 to transmit signals to the first metal pattern 1211 and the second metal pattern 1212 through the feeding pattern 1220. The baseband processor 1400 may control the transceiver circuit 1250 to transmit and receive signals of the 5G Sub 6 band through the antenna 1200.

On the other hand, the antenna 1200 may further include a plurality of vias 1230. In this regard, the plurality of vias 1230 may be formed at end portions EP1, EP2 of the first metal pattern 1211 and the second metal pattern 1212 to connect the first metal pattern 1211 and the second metal pattern 1212 and a lower ground pattern. The plurality of vias 1230 may be disposed at terminated portions of the first metal pattern 1211 and the second metal pattern 1212 to be spaced inwardly apart from one another by predetermined distances.

Figure 3C:
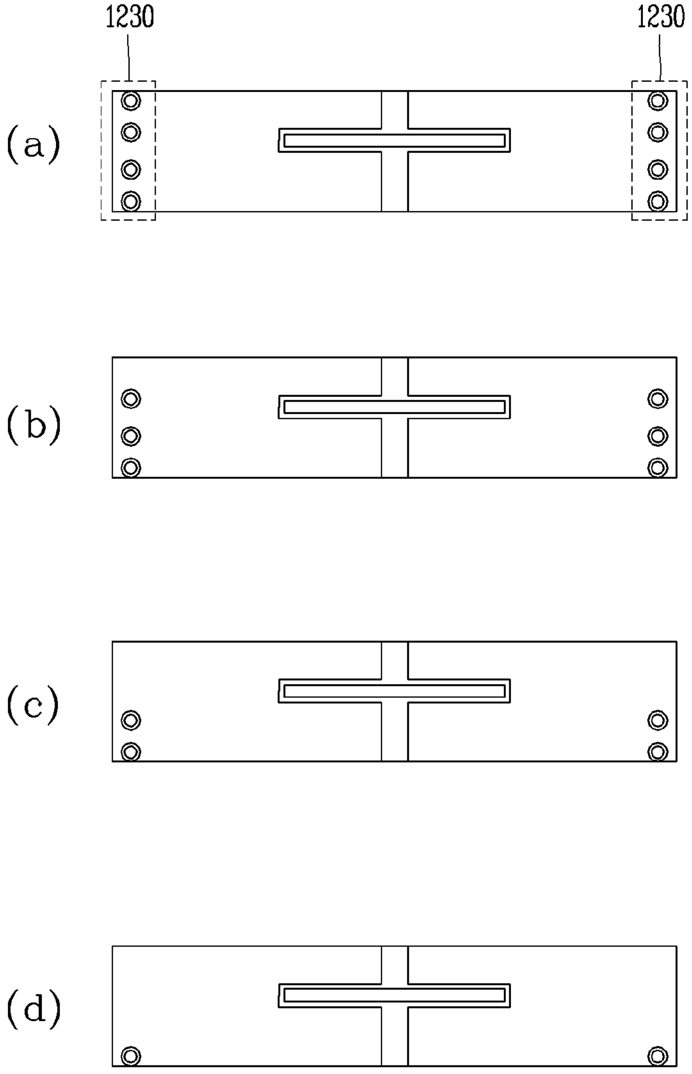
FIG. 3C is a view illustrating an antenna structure according to the number of vias. Also.

Hereinafter, changes in characteristics according to the number and positions of a plurality of vias in the low-profile antenna according to the present disclosure will be described. FIG. 3C is a view illustrating an antenna structure according to the number of vias. Also, FIG. 3D is a view illustrating the change in resonant frequency according to the change in the number of vias.

Referring to FIGS. 3A to 3D, it can be seen that the resonant frequency decreases as the number of vias disposed at the end portions of the first metal pattern 1211 and the second metal pattern 1212 decreases. In this regard, as the number of vias in FIG. 3C decreases to 4, 3, 2, and 1, the resonant frequency may decrease in a direction of a line indicated by (a) to (d) in FIG. 3D. Here, dB(S(1,1)) may mean the return loss of the antenna 1200 having one port, and a frequency with the lowest value of dB(S(1,1)) may correspond to the resonant frequency. In this case, as the number of vias decreases as illustrated in (a) to (d) of FIG. 3C, the resonant frequency of the antenna may tend to decrease as indicated by (a) to (d) in FIG. 3D.

On the other hand, the low-profile antenna may operate as a patch antenna that resonates at a length of about ¼ wavelength by connecting the first metal pattern 1211 and the second metal pattern 1212 corresponding to the radiators and the ground layer. In this regard, when the number of vias decreases, a path through which a current is bypassed may further be created. Accordingly, as the number of vias decreases and the ground connection area decreases, the length of the antenna can increase, thereby lowering the resonant frequency. Accordingly, from the perspective of miniaturization of the antenna, the number of vias in the antenna according to the present disclosure may be one or two at a lower end of an end portion.

Figure 3D:
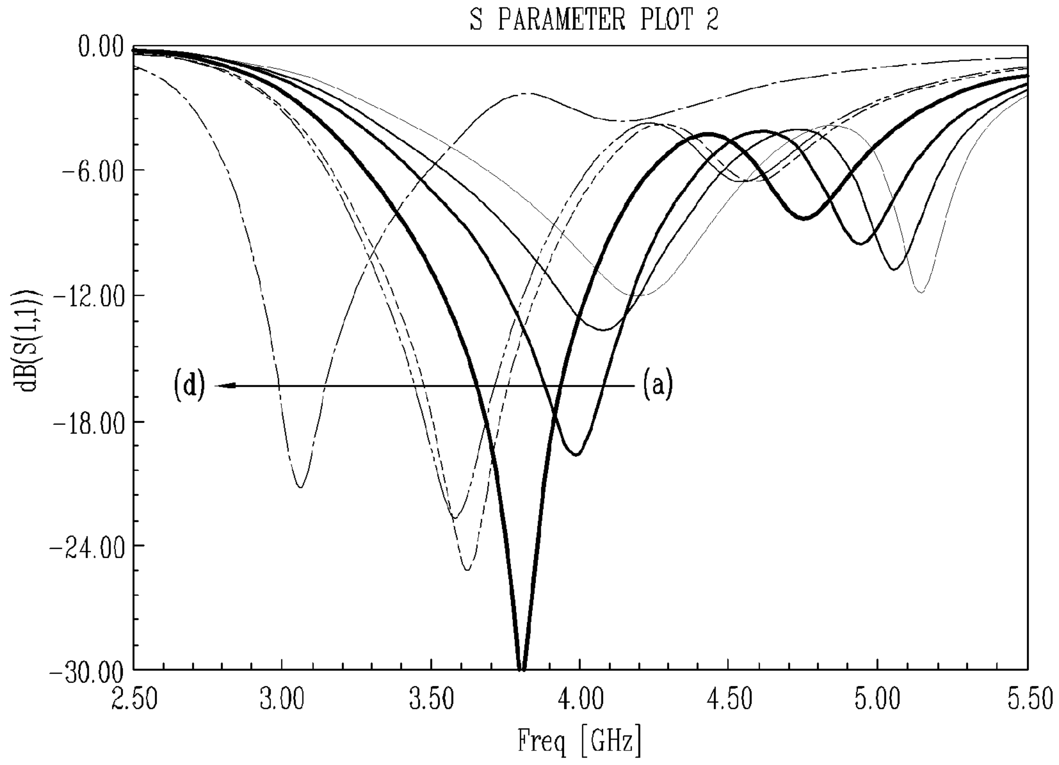
FIG. 3D is a view illustrating the change in resonant frequency according to the change in the number of vias.

Meanwhile, referring to FIGS. 3C and 3D, the resonant frequency when the number of vias is 1 may be almost the same as the resonant frequency when the number of vias is 2. Therefore, two or more vias may be selected in consideration of structural stability and radiation efficiency of the antenna. In this regard, when the number of vias is 3 or 4, the resonant frequency may be shifted to a higher frequency, which may be somewhat disadvantageous in terms of miniaturization of the antenna. However, as the number of vias increases, it can be advantageous in terms of antenna radiation efficiency as well as structural stability. Accordingly, three or four vias can be selected in consideration of the radiation efficiency as well as structural stability of the antenna.

With the aforementioned structure, a low-profile antenna that has high antenna space utilization and arrangement freedom while optimizing wireless performance can be provided.

In particular, the low-profile antenna can be effectively designed to have a very low height of 0.02λ or lower, and can easily implement impedance matching.

In particular, the low-profile antenna may have a radiator with both end portions shorted, which can be advantageous in view of arranging plural antennas by virtue of miniaturization of antennas and improvement of isolation between antennas.

On the other hand, the first metal pattern 1211 and the second metal pattern 1212, which are the antenna patterns according to the present disclosure, may be designed in various shapes such as a triangle, a square (or rectangle), and a circle, but the biggest feature may be that the shorted arms ① and ② are spaced apart from each other and a resonant frequency and a bandwidth vary depending on the shape. A length from the terminated portion of the pattern to a shorted point by a contact pin may have the greatest influence on the antenna resonant frequency. On the other hand, as an antenna area is increased, the resonant frequency may be lowered and the bandwidth may be widened. A distance between the two antenna patterns may affect impedance, and a coupling amount may be adjusted according to the length and distance between the two antenna patterns facing each other.

Figure 4A:
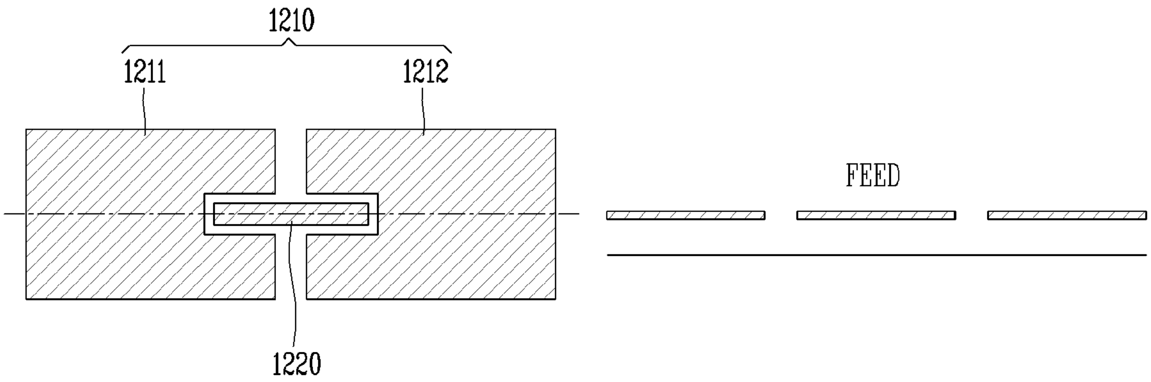
FIG. 4A is a view illustrating a structure in which a feeding pattern is disposed on the same plane with a metal pattern that is a radiator.
Figure 4B:
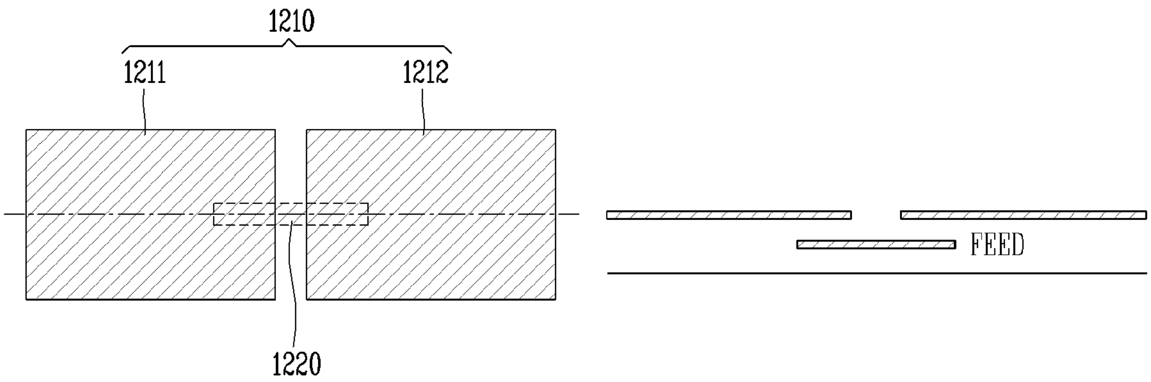
FIG. 4B is a view illustrating a structure in which the feeding pattern is disposed on a different plane from the metal pattern that is the radiator.

Meanwhile, feeding of the antenna 1200 may be carried out on the same plane as or a different plane from the metal pattern that is the radiator. FIG. 4A is a view illustrating a structure in which a feeding pattern is disposed on the same plane with a metal pattern that is a radiator. FIG. 4B is a view illustrating a structure in which the feeding pattern is disposed on a different plane from the metal pattern that is the radiator.

The antenna feeding method may be indirect feeding, and may be configured to allow feeding by arranging the feeding pattern on the same layer as the antenna pattern with a gap therebetween as illustrated in FIG. 4A or by arranging the feeding pattern on a different layer from the antenna pattern as illustrated in FIG. 4B. In this regard, impedance may vary depending on the distance between the feeding pattern and the metal pattern and the length and position of the feeding pattern as well as the distance between the two metal patterns. Accordingly, the impedance of the antenna can be adjusted by the antenna structure having a low height.

The first and second metal patterns 1211 and 1222, which are the antenna patterns made of a metal component, may be disposed on one or more dielectrics. Such a dielectric may be disposed between the first and second metal patterns 1211 and 1222 and a ground layer. The performance and size of the antenna can be adjusted when two or more dielectrics are used rather than one dielectric.

The first substrate S1 as the upper substrate and the second substrate S2 as the lower substrate that correspond to the dielectrics may be implemented in the same form as a flexible substrate. Accordingly, the low-profile antenna 1200 that is implemented on the flexible substrate can be disposed inside the electronic device. For example, the low-profile antenna 1200 that is implemented on the flexible substrate can be disposed on a carrier inside the electronic device.

As described above, the first metal pattern and the second metal pattern may be disposed on the upper portion of the first substrate S1 as the upper substrate. Meanwhile, the antenna 1200 may further include a ground layer disposed on the lower portion of the second substrate S2, which is the lower substrate, to provide a reference electric potential for the antenna 1200.

On the other hand, antenna characteristics may appear differently depending on the dielectric material between the metal patterns 1211 and 1212 and the ground. High permittivity may be advantageous in miniaturizing the antenna, and a small dielectric loss can secure better efficiency characteristics. Accordingly, the antenna performance can be optimized by varying each thickness and material (i.e., permittivity) of the multilayered dielectrics.

In this case, the permittivity of the first substrate S1 may be set to a value greater than that of the second substrate S2, thereby increasing efficiency of the antenna 1200 while reducing the size of the antenna 1200. In this regard, when the permittivity of the first substrate S1 is high, the antenna efficiency may be somewhat decreased, but the decrease in the antenna efficiency may be somewhat alleviated by the low permittivity of the second substrate S2. Accordingly, the antenna size can be reduced by setting the permittivity of the substrate S1 to a greater value. In addition, the antenna efficiency which is a little bit reduced by the permittivity of the first substrate S1 can be alleviated by the low permittivity of the second substrate S2.

Figure 5A:
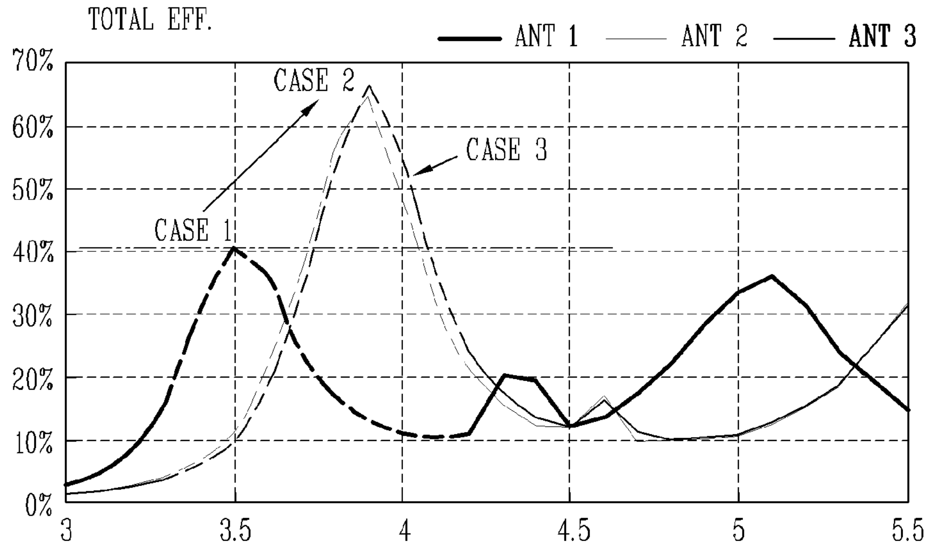
FIG. 5A is a view illustrating radiation efficiency according to a frequency change when a different dielectric is used in a low-profile antenna of a multilayered substrate structure.

FIG. 5A is a view illustrating radiation efficiency according to a frequency change when a different dielectric is used in a low-profile antenna of a multilayered substrate structure. Referring to FIG. 5A, it can be seen that as the permittivity decreases, the resonant frequency increases and the radiation efficiency increases. For example, when a substrate material is changed from an FR 4 substrate to a Teflon substrate, the resonant frequency may increase and the radiation efficiency may be improved. In this case, it was assumed that the FR 4 substrate had permittivity (Dk) of 4.5 and a dielectric loss of 0.015, and the Teflon substrate has permittivity of 3.0 and a dielectric loss of 0.0014. Here, Case 1 is a case in which both the first substrate and the second substrate are the FR 4 substrates. On the other hand, Case 2 is a case in which the first substrate is the Teflon substrate and the second substrate is the FR 4 substrate. In Case 2, since the first substrate has the low permittivity, the radiation efficiency of the antenna can increase.

In addition, Case 3 is a case in which both the first and second substrates are the Teflon substrates. Comparing Case 2 and Case 3, since the antenna radiation efficiency is greatly affected by the permittivity of the first substrate, which is the upper substrate, the radiation efficiency is almost the same. Accordingly, in the low-profile antenna of the present disclosure, the permittivity of the first substrate and the permittivity of the second substrate can be made different from each other, thereby optimizing other antenna characteristics such as impedance matching while maintaining the antenna radiation efficiency characteristic.

Table 1 shows a resonant frequency, a bandwidth, and a maximum efficiency according to changes in configuration of the first substrate as the upper substrate and the second substrate as the lower substrate according to one implementation. Here, it was assumed that the thickness of the first substrate was 0.4 mm and the thickness of the second substrate was 0.6 mm, but the present disclosure may not be limited thereto and may be variously changed depending on applications. Meanwhile, in relation to the antenna performance results of Table 1, it was assumed that the feeding pattern was disposed below the metal pattern, which is the antenna pattern, as illustrated in FIG. 4B, but the present disclosure may not be limited thereto and may be variously changed depending on applications.

TABLE 1

| Case | 1) First substrate (0.4 mm) | 2) Second substrate (0.6 mm) | Resonant frequency (f0) [GHz] | −6 dB BW | Peak Eff. [%] |
|---|---|---|---|---|---|
| 11 | FR4 | FR4 | 3.53 | 0.24 | 41.3 |
| 22 | Teflon | FR4 | 3.9 | 0.19 | 65 |
| 23 | Teflon | Teflon | 3.92 | 0.18 | 66.5 |

Referring to Table 1, when the permittivity of the first substrate is reduced, the resonant frequency increases from a 3.5 GHz band to a 3.9 GHz band. As aforementioned, the permittivity of the first substrate S1 may be set to a value greater than that of the second substrate, thereby increasing the efficiency of the antenna 1200 while reducing the size of the antenna 1200. Accordingly, the antenna size can be reduced by using the FR 4 substrate with the high permittivity for the first substrate and the antenna efficiency can be increased by using the Teflon substrate with the low permittivity for the second substrate. As another example, the second substrate may have a lower permittivity and may be implemented in the form of a foam having permittivity similar to that of air.

Meanwhile, in relation to the multilayered substrate structure, the feeding pattern 1220 may be disposed on the upper portion of the first substrate that is coplanar with the first metal pattern 1211 and the second metal pattern 1212. As another example, the feeding pattern 1220 may be disposed on the lower portion of the first substrate or the upper portion of the second substrate that is a different plane from the first metal pattern 1211 and the second metal pattern 1212. In this regard, the feeding pattern 1220 may be disposed on the lower portion of the first substrate, which is the substrate where the metal patterns 1211 and 1212 are disposed. As the feeding pattern 1220 is disposed on the lower portion of the first substrate, an alignment error between the metal patterns may be reduced compared to the case in which the feeding pattern 1220 is disposed on the upper portion of the second substrate.

As the permittivity or thickness of the dielectric increases, the resonant frequency may be lowered, which can allow the reduction of the antenna size. Also, when a dielectric having relatively high permittivity is disposed on the antenna pattern side, an antenna miniaturization effect can be obtained. In this case, when an air layer or a dielectric having a low permittivity is disposed close to the ground, the efficiency of the antenna can be improved. Although the area of the dielectric is not relevant, the dielectric loss may be reduced by thinning the feeding pattern 1220 and a slot (the gap between the metal patterns).

Even when the dielectric substrate is close to a separate wide ground layer, impedance matching can be made through the adjustment of the distances between the metal patterns 1211 and 1222 and the feeding pattern 1220, thereby enabling an operation as antennas. In this case, the antenna radiation can also be effectively performed by a horizontal magnetic field produced by the metal pattern and the contact pin.

Figure 5B:
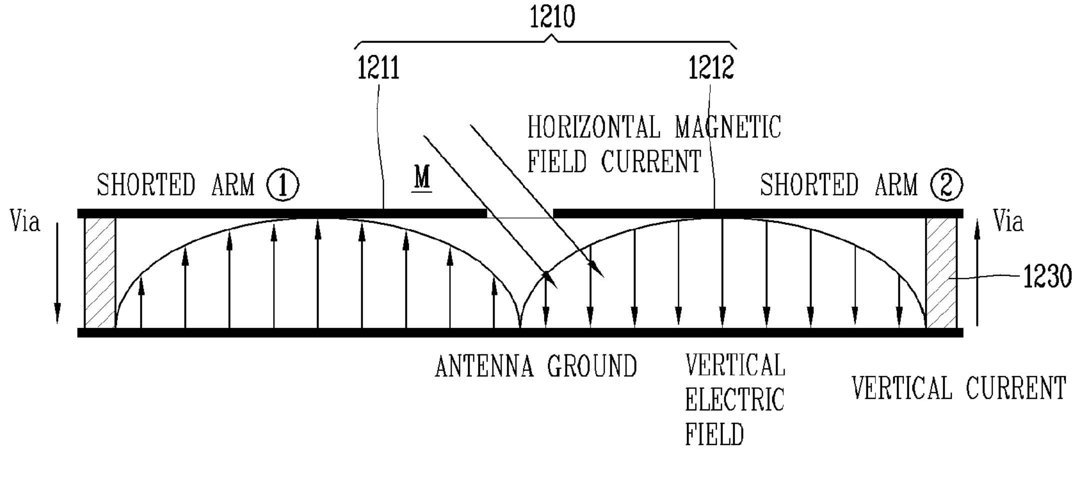
FIG. 5B is a view illustrating a principle of forming a vertical electric field and a horizontal magnetic field current in an antenna having a shorted-arm structure by vias according to the present disclosure.

FIG. 5B is a view illustrating a principle of forming a vertical electric field and a horizontal magnetic field current in an antenna having a shorted-arm structure by vias according to the present disclosure. Referring to FIGS. 3A to 5B, a vertical electric field may be generated between the first and second metal patterns 1211 and 1212 corresponding to the shorted arms and the ground layer. According to the vertical electric field, a horizontal magnetic field current may be generated on the horizontal plane with the first and second metal patterns 1211 and 1212. In particular, the horizontal magnetic field current may be generated in a boundary region of the feeding pattern 1220 and a boundary region of the inset region. The horizontal magnetic field current may allow the reduction of the height of the substrate where the antenna 1200 is disposed, thereby implementing a low-profile antenna.

As illustrated in FIG. 5B, the shorted arm may be formed by the vias, and a cavity-backed slot antenna may be implemented by the ground layer. In particular, since it is formed in an integrated structure in the form of a substrate, it may be referred to as a Substrate Integrated Waveguide (SIW) cavity-backed slot Antenna. Therefore, as the SIW cavity-backed slot antenna, the low-profile antenna can be implemented by forming cavities using the slot, the ground and the vias. Referring to the vertical electric field distribution of FIG. 5B, in the SIW cavity-backed slot antenna, a partial region of the entire antenna that generates the vertical current and the vertical electric field may be selected to be implemented as an antenna. Accordingly, the antenna 1200 can be advantageously minimized in height and antenna area.

Meanwhile, even when the size of the ground is smaller than or equal to the size of the antenna pattern, the antenna may operate as a kind of folded dipole antenna. In addition, the contact pin (shorting pin) that connects the antenna pattern and the ground can be applied in various ways. The antenna pattern and the ground may be connected through via holes formed through between dielectrics, or by using C-clips, Pogo pins, springs, fingers, or the like.

As described above, the antenna according to the present disclosure may be configured such that the two patterns (shorted arms) 1211 and 1212 each having one end shorted are disposed to face each other with the distance therebetween and fed by the feeding pattern 1220 through indirect coupling. In this case, the vertical current that flows through vertical connection portions connecting the patterns and the ground, that is, through the vias may be generated. That is, the horizontal magnetic field current may be generated by the vertical electric field generated between the metal patterns 1211 and 1212 and the ground layer. This horizontal magnetic field current may be very efficient at a low antenna height.

Figure 6A:
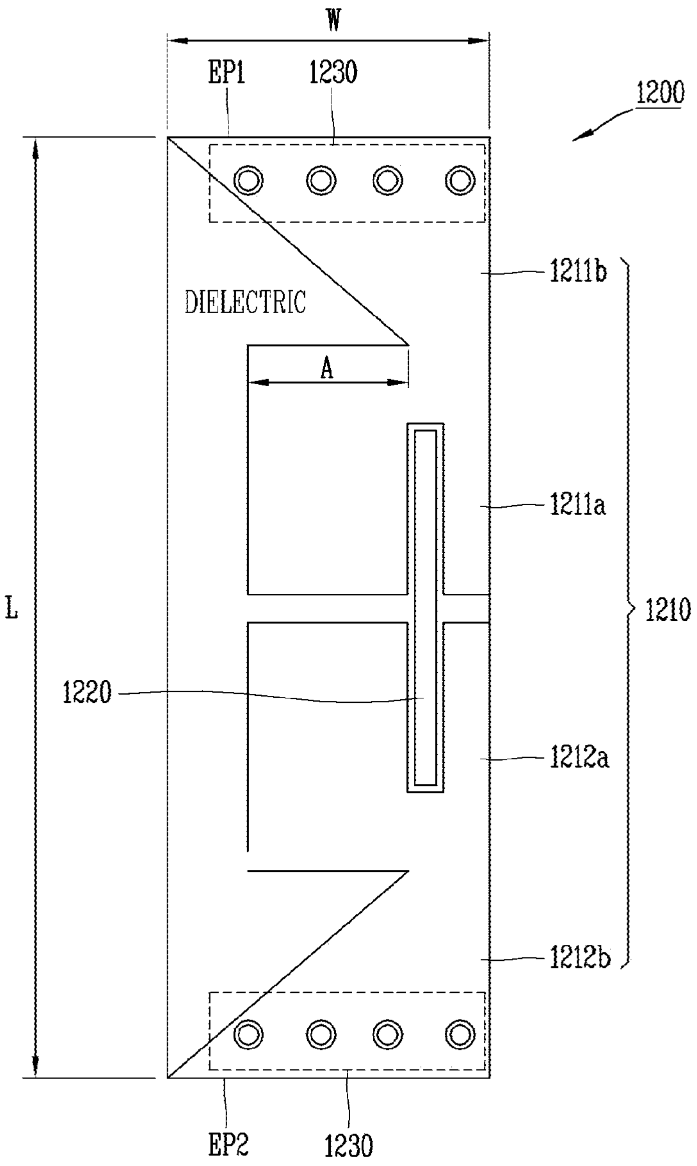
FIG. 6A is a front view illustrating a low-profile antenna in accordance with one implementation.
Figure 6B:
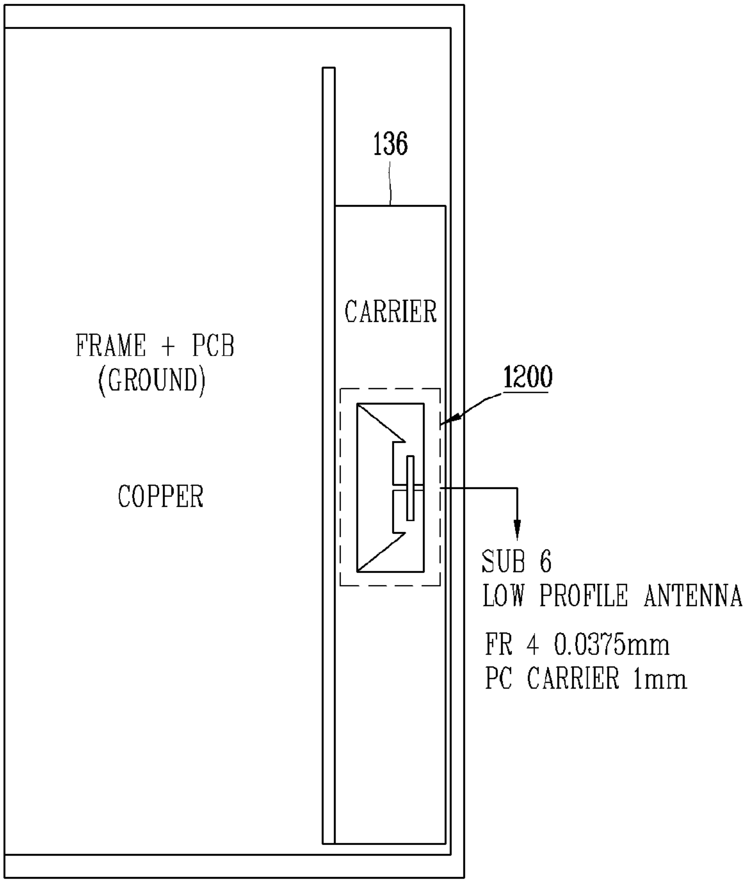
FIG. 6B is a view illustrating a structure in which the antenna of FIG. 6A is disposed on a carrier inside the electronic device.

Meanwhile, the metal pattern of the low-profile antenna may be implemented in various shapes other than the rectangular (or square) shape for optimization of performance. For example, the low-profile antenna may be formed in a combined structure of a rectangular shape and a bow-tie shape. FIG. 6A is a front view illustrating a low-profile antenna in accordance with one implementation. FIG. 6B is a view illustrating a structure in which the antenna of FIG. 6A is disposed on a carrier inside the electronic device.

Referring to FIG. 6A, the first metal pattern 1211 may include a first radiation portion 1211*a* and a second radiation portion 1211*b*. Also, the second metal pattern 1212 may include a first radiation portion 1212*a* and a second radiation portion 1212*b*. Here, since a signal of the feeding pattern 1220 is coupled to the first radiation portions 1211*a* and 1212*a*, the first radiation portions 1211*a* and 1212*a* may be referred to as a coupling part and the second radiation portions 1211*b* and 1212*b* may be referred to as a radiation part.

The first radiation portions 1211*a* and 1212*a* may be formed in a rectangular shape having a predetermined length and width, and may define an inset region therein. In addition, the second radiation portions 1211*b* and 1212*b* may be connected to the first radiation portions 1211*a* and 1212*a* and tapered at a predetermined angle to increase widths. That is, the second radiation portions 1211*b* and 1212*b* may be formed in a bow-tie shape to linearly increase in width.

Meanwhile, the feeding pattern 1220 may be disposed in the inset region inside the first radiation portions 1211*a* and 1212*a* corresponding to the coupling part. In this case, the position at which the feeding pattern 1220 is disposed may be offset by a predetermined distance from end portions in a widthwise direction of the first radiation portions 1211*a* and 1212*a*.

Referring to FIG. 6B, the electronic device may further include a carrier 136 that is formed of a dielectric and disposed inside the electronic device. In this case, the antenna 1200 may be disposed on a front surface of the carrier 136 and the first and second metal patterns 1211 and 1212 may be disposed in the longitudinal direction of the electronic device. Accordingly, MIMO can be performed by disposing a plurality of low-profile antennas on the carrier 136.

In this regard, the arrangement structure may be employed in the electronic device by adjusting the length and width of the substrate on which the low-profile antennas are disposed. In this regard, the length of the antenna 1200 of FIG. 6A may vary within a predetermined range. As such, when the length of the antenna 1200 of FIG. 6A varies within the predetermined range, the resonant frequency and the radiation efficiency can change. In this regard, as a length L of the antenna 1200 increases from 22 mm to 36 mm, the resonant frequency may be lowered from about 4 GHz to about 2.5 GHz. In addition, as the length L of the antenna 1200 increases from 22 mm to 36 mm, the peak radiation efficiency may decrease from −4.1 dB to −6.2 dB.

In this case, the width W of the antenna 1200 has been assumed to be 10 mm, but the present disclosure may not be limited thereto and may change depending on applications. The length L can be set to about 23 mm so that the antenna 1200 resonates at 3.5 GHz which is in the 5G Sub 6 band. However, the length L of the antenna 1200 may not be limited thereto, and the resonant frequency may change depending on the length of the feeding pattern 1220 or the area of the metal pattern 1210.

Hereinafter, the changes in characteristics according to the width of the substrate on which the low-profile antenna is disposed will be described. In this regard, a width W of the antenna 1200 may vary from 8 mm to 12 mm. Accordingly, the width of the end portions of the second radiation portions 1211*b* and 1212*b* may be set to a value in the range of 8 to 12 mm in consideration of the resonant frequency and radiation efficiency of the antenna.

Figure 7:
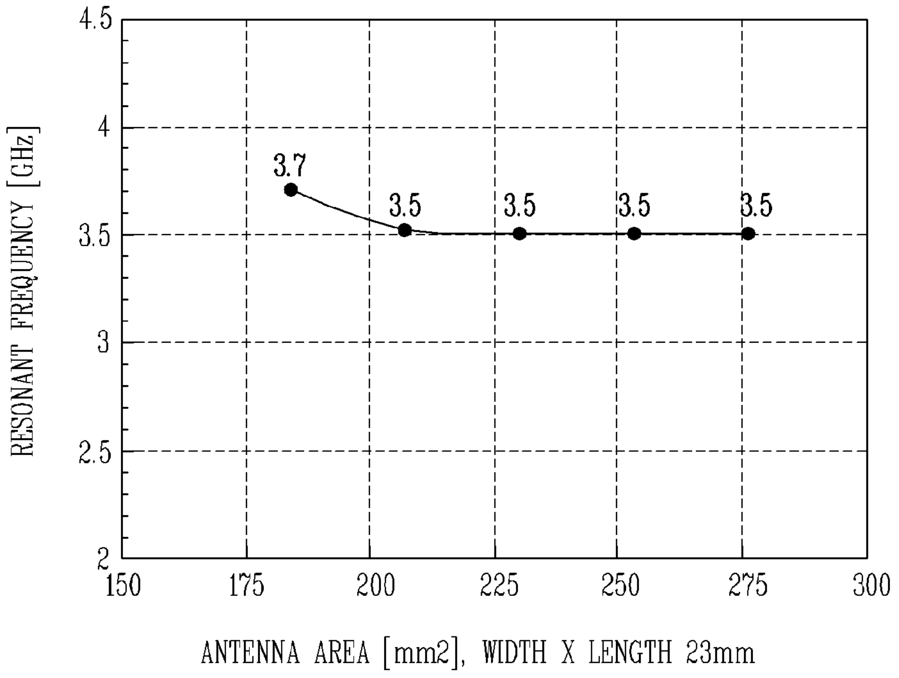
FIG. 7 is a view illustrating a change in resonant frequency and peak radiation efficiency according to a change in antenna width.
Figure 7:
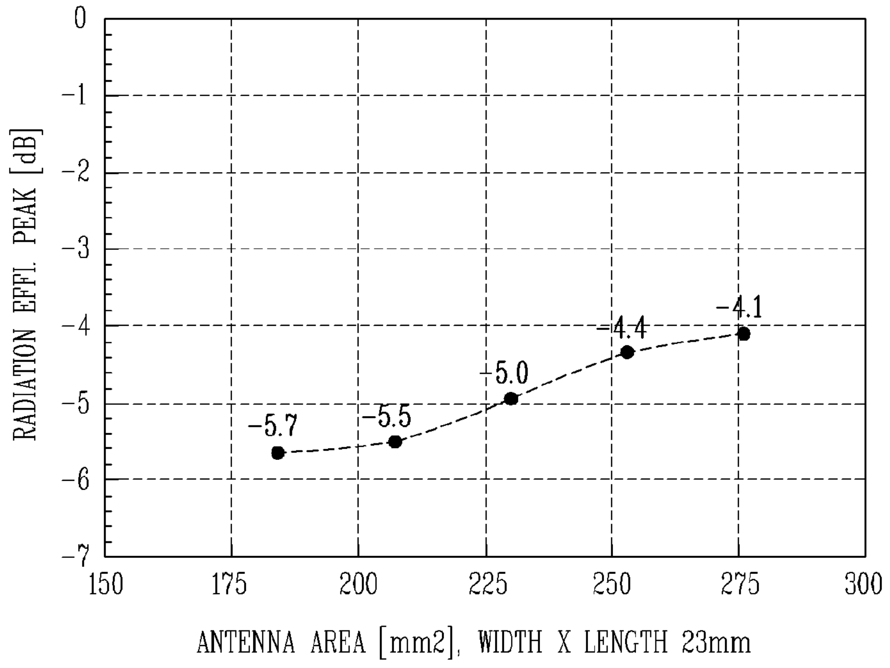

In this case, when a width of an antenna pattern increases, the resonant frequency may be lowered but an effect may not be so great compared to the increase in length. However, as the width of the antenna pattern increases, the antenna efficiency may increase and thus an efficiency bandwidth may also increase. FIG. 7 is a view illustrating a change in resonant frequency and peak radiation efficiency according to a change in antenna width.

Referring to (a) of FIG. 7, as the width of the end portions of the second radiation portions 1211*b* and 1212*b* increases from 8 mm to 9 mm, the resonant frequency may be lowered from 3.7 GHz to 3.5 GHz and thus the antenna may resonate at the 5G Sub 6 frequency. In this case, the resonant frequency may be maintained at 3.5 GHz even when the width of the end portion increases up to 12 mm. Therefore, in view of miniaturization of the antenna, it may be advantageous to set the width of the end portions of the second radiation portions 1211*b* and 1212*b* to about 9 mm.

Meanwhile, referring to (b) of FIG. 7, it can be seen that the peak radiation efficiency increases as the width of the end portions of the second radiation portions 1211*b* and 1212*b* increases from 8 mm to 12 mm. Accordingly, the width of the end portions of the second radiation portions 1211*b* and 1212*b* may be set to 10 mm to 11 mm in consideration of both the antenna resonant frequency and the radiation efficiency.

Figure 8:
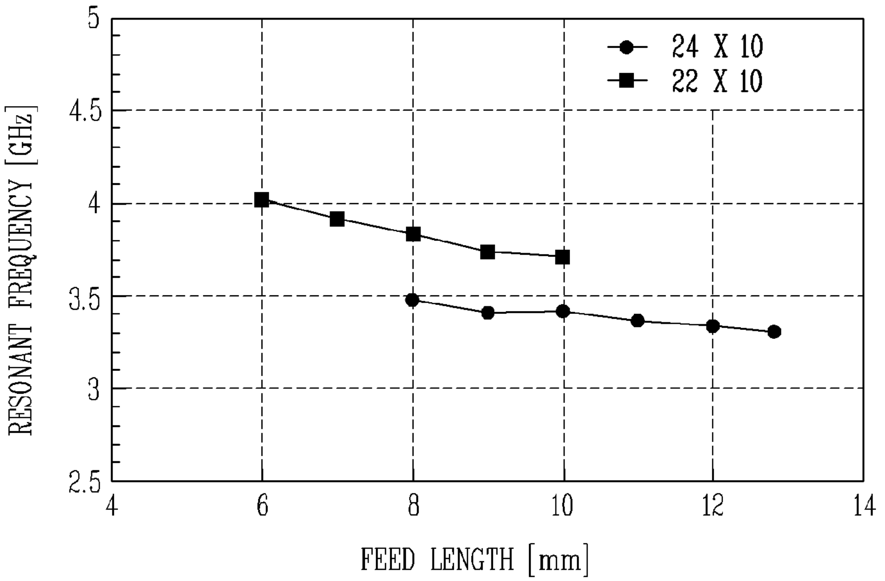
FIG. 8 is a view illustrating a resonant frequency and peak total efficiency according to variation of a length of the low-profile antenna and a length of a feeding pattern.
Figure 8:
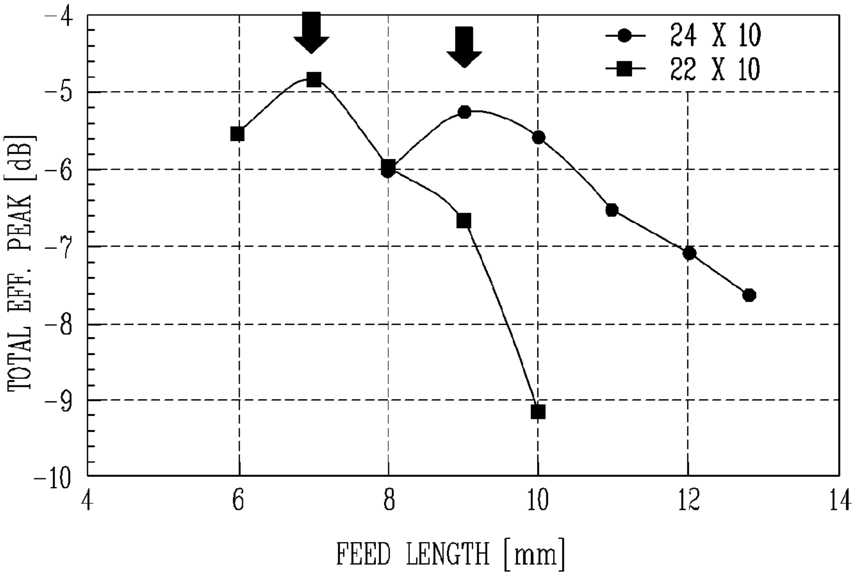
Figure 9:
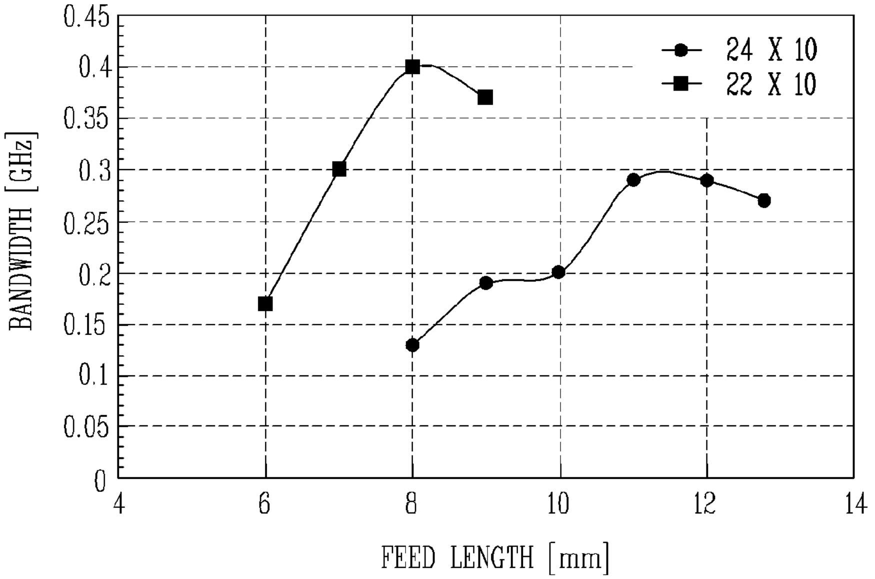
FIG. 9 is a view illustrating a bandwidth and peak radiation efficiency according to variation of a length of the low-profile antenna and a length of a feeding pattern.
Figure 9:
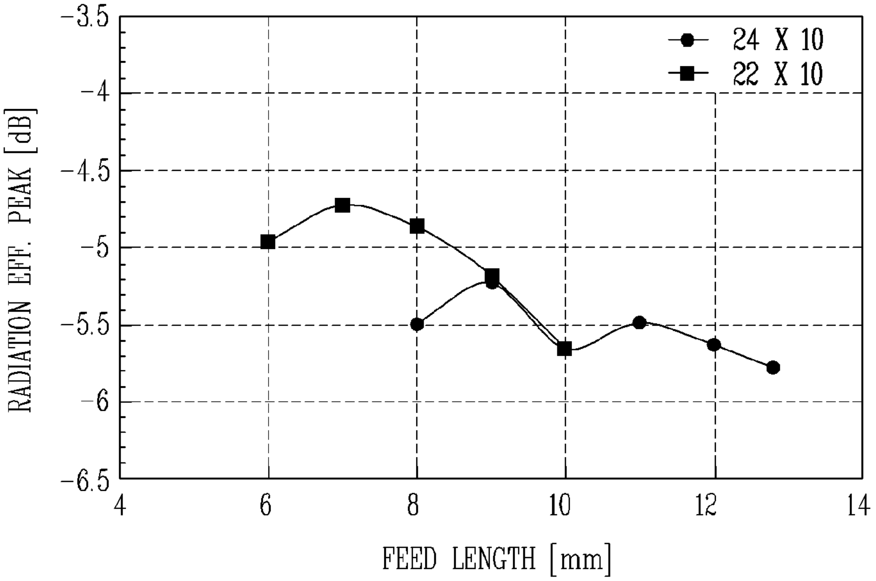

Meanwhile, the low-profile antenna can optimize the resonant frequency, bandwidth, peak radiation efficiency, and peak total efficiency by varying the length of the feeding pattern 1220. FIG. 8 is a view illustrating a resonant frequency and peak total efficiency according to variation of a length of the low-profile antenna and a length of a feeding pattern. FIG. 9 is a view illustrating a bandwidth and peak radiation efficiency according to variation of the length of the low-profile antenna and the length of the feeding pattern. Here, the peak radiation efficiency may radiation efficiency of the antenna considering an antenna loss, and the peak total efficiency may indicate efficiency considering both the antenna loss and feeding loss.

Accordingly, the length of the feeding pattern 1220 may be set in consideration of the resonant frequency, bandwidth, and radiation efficiency of the antenna. To this end, the length of the feeding pattern 1220 may be set to a value of 0.3 to 0.4 times a length from the terminated portion of the first metal pattern to the terminated portion of the second metal pattern. That is, the length of the feeding pattern 1200 may be set to a value of 0.3 to 0.4 times the length of the antenna.

As a feeding length increases, an area occupied by the antenna pattern may decrease, but referring to (a) of FIG. 8, the resonant frequency may be lowered according to the feeding length. Therefore, there may be an appropriate feeding length according to the length of the antenna, and the feeding length that is 0.3 to 0.4 times the total length of the antenna pattern may be required. Here, 24×10 may indicate that length L and width W of the antenna are 24 mm and 10 mm, respectively. Also, 22×10 may indicate that length L and width W of the antenna are 22 mm and 10 mm, respectively.

Referring to FIG. 6A and (b) of FIG. 8, when the length L and the width W of the antenna are 24 mm and 10 mm, respectively, the maximum peak total efficiency can be obtained when the length of the feeding pattern 1200 is about 9 mm. Therefore, the length of the feeding pattern 1200 may be set to be 0.3 to 0.4 times the total length of the antenna pattern.

Referring to FIG. 6A and (a) of FIG. 9, when the length L and the width W of the antenna are 24 mm and 10 mm, respectively, the maximum bandwidth can be obtained when the length of the feeding pattern 1200 is about 11 mm. In this case, the length of the feeding pattern 1200 may exceed 0.4 times the total length of the antenna pattern.

However, it may be advantageous that the length of the feeding pattern 1200 is set to about 9 mm in order to maximize efficiency while satisfying the bandwidth requirement. Therefore, the length of the feeding pattern 1200 may be set to be 0.3 to 0.4 times the total length of the antenna pattern.

Referring to FIG. 6A and (b) of FIG. 9, when the length L and the width W of the antenna are 24 mm and 10 mm, respectively, similar to (b) of FIG. 8, the maximum peak total efficiency can be obtained when the length of the feeding pattern 1200 is about 9 mm. Therefore, the length of the feeding pattern 1200 may be set to be 0.3 to 0.4 times the total length of the antenna pattern.

On the other hand, the low-profile antenna can adjust impedance and resonant frequency of the antenna by adjusting a difference between the widths of the first radiation portion and the second radiation portion at a point where the first radiation portion and the second radiation portion are connected, that is, the length of the coupling part. In this regard, the difference between the widths of the first radiation portion and the second radiation portion at the point where the first radiation portion and the second radiation portion are connected, that is, the length of the coupling part may be set to a value in the range of 1 to 5 mm.

Figure 10:
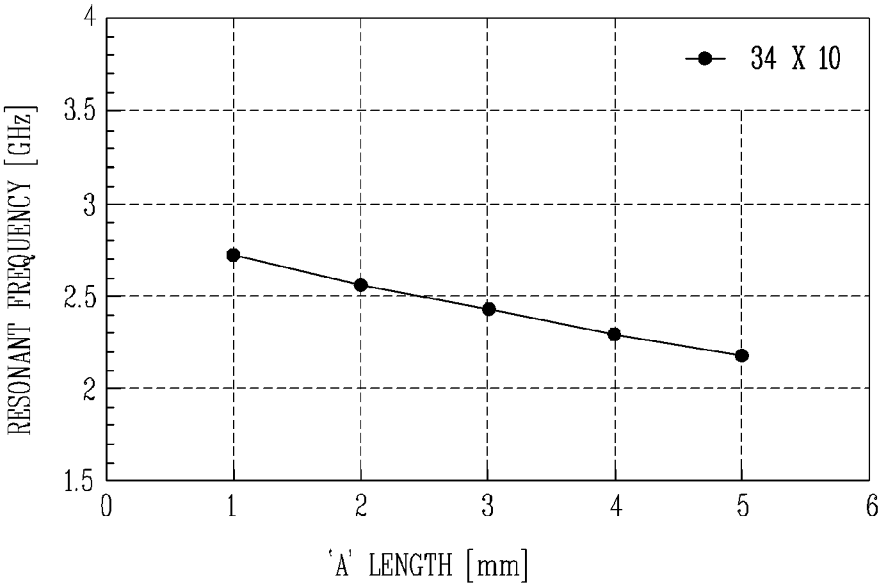
FIG. 10 is a view illustrating a resonant frequency and peak total efficiency according to variation of a length of a coupling part in the low-profile antenna.
Figure 10:
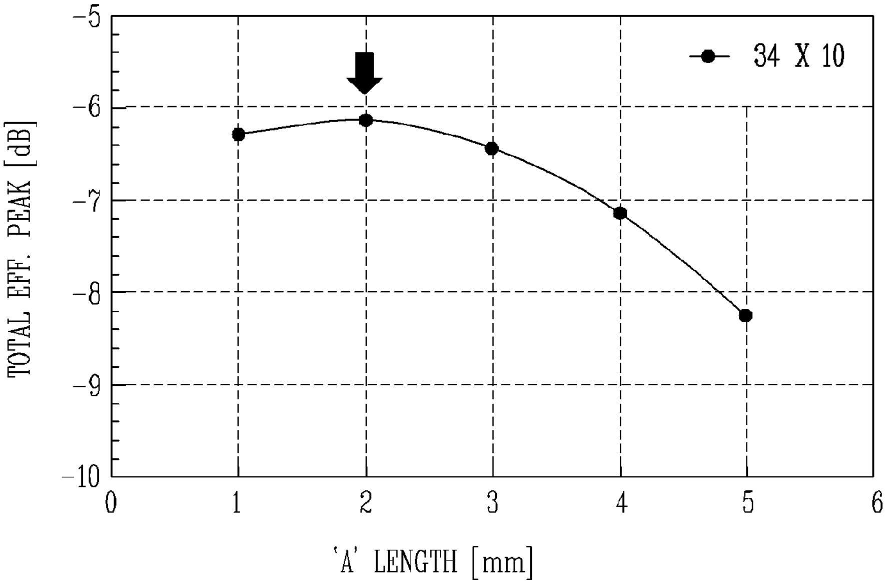
Figure 11:
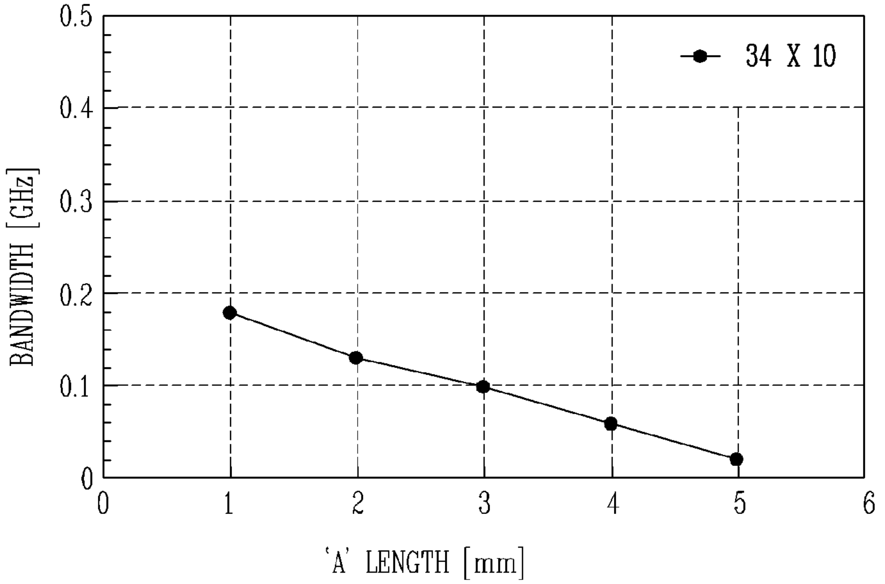
FIG. 11 is a view illustrating a bandwidth and peak radiation efficiency according to variation of a length of a coupling part in the low-profile antenna.
Figure 11:
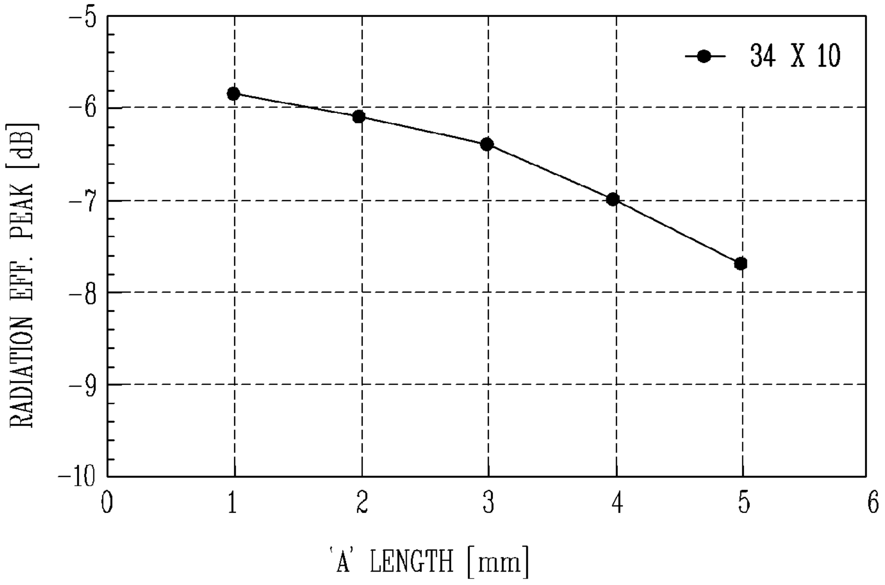

FIG. 10 is a view illustrating a resonant frequency and peak total efficiency according to variation of the length of the coupling part in the low-profile antenna. FIG. 11 is a view illustrating a bandwidth and peak radiation efficiency according to variation of the length of the coupling part in the low-profile antenna. Here, the peak radiation efficiency may be radiation efficiency of the antenna considering antenna loss, and the peak total efficiency may indicate efficiency considering both the antenna loss and feeding loss.

As the length of the coupling part increases, the resonant frequency may be lowered, enabling miniaturization of the antenna. Referring to FIGS. 6A and (a) of FIG. 10, as the length A of the coupling part increases, the resonant frequency may decrease. Here, 34×10 may indicate that length L and width W of the antenna are 34 mm and 10 mm, respectively. On the other hand, when the length of the feeding pattern was set to 13 mm, the antenna characteristics were compared while the length of the coupling part varied from 1 mm to 5 mm.

Referring to FIG. 6A and (b) of FIG. 10, when the length L and the width W of the antenna are 34 mm and 10 mm, respectively, the maximum peak total efficiency can be obtained when the length A of the coupling part is about 2 mm.

Referring to FIG. 6A and (a) of FIG. 11, when the length L and the width W of the antenna are 34 mm and 10 mm, respectively, the maximum bandwidth can be obtained when the length A of the coupling part is 1 mm.

Referring to FIG. 6A and (b) of FIG. 11, when the length L and the width W of the antenna are 34 mm and 10 mm, respectively, the maximum peak radiation efficiency can be obtained when the length A of the coupling part is 1 mm. On the other hand, referring to (b) of FIG. 10, when the length of the coupling part is about 2 mm, the sum of the antenna loss and the feeding loss may be the lowest. In this regard, when the length of the coupling part is 1 mm, the antenna loss may be the lowest but an antenna area for the feeding pattern may be insufficient. Therefore, when considering both the antenna loss and the feeding loss, it may be advantageous to set the length of the coupling part to about 2 mm.

On the other hand, it can be seen that the impedance changes when the length A of the coupling part varies. As the length A of the coupling part increases, a coupling amount between the feeding pattern and the antenna pattern may decrease. Accordingly, the locus length in the Smith chart, which represents impedance change according to frequencies with polar coordinates, may be reduced and the resonance frequency may be lowered. Therefore, when the length A of the coupling part varies, both the impedance and the resonant frequency of the antenna may all be affected. Therefore, antenna characteristics can be optimized by varying the shapes of the regions of the first and second radiation portions including the length A of the coupling part.

On the other hand, the low-profile antenna of the various shapes according to the present disclosure may operate in the 5G Sub 6 band. In this case, the operating band of the low-profile antenna of various shapes may not be limited thereto, and may operate in any communication frequency band. The low-profile antenna may operate in the 5G Sub 6 band, and antennas implemented as conductive members disposed on the side surfaces of the electronic device may operate in the LTE band. As such, a control operation for a plurality of antennas operating in a plurality of communication systems may be required.

Figure 12:
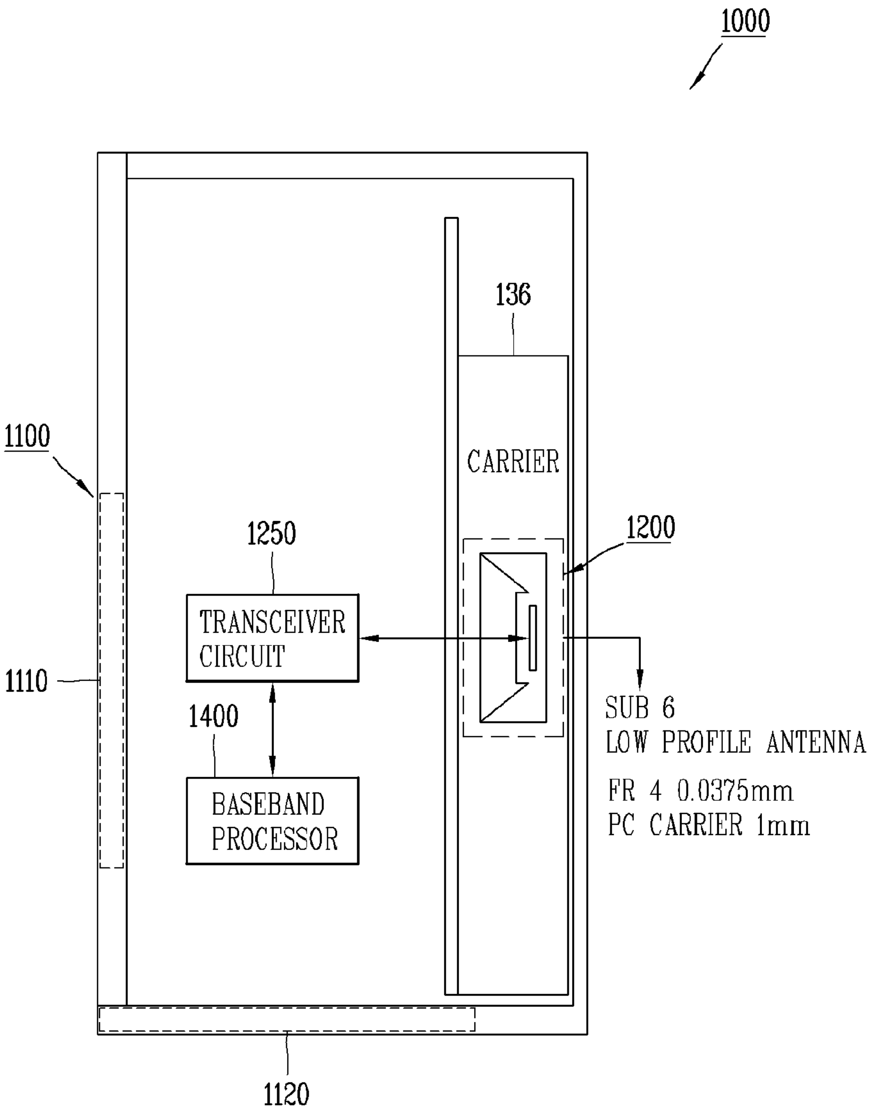
FIG. 12 is a view illustrating an electronic device including antennas, a transceiver circuit, and a baseband processor according to the present disclosure.
Figure 13:
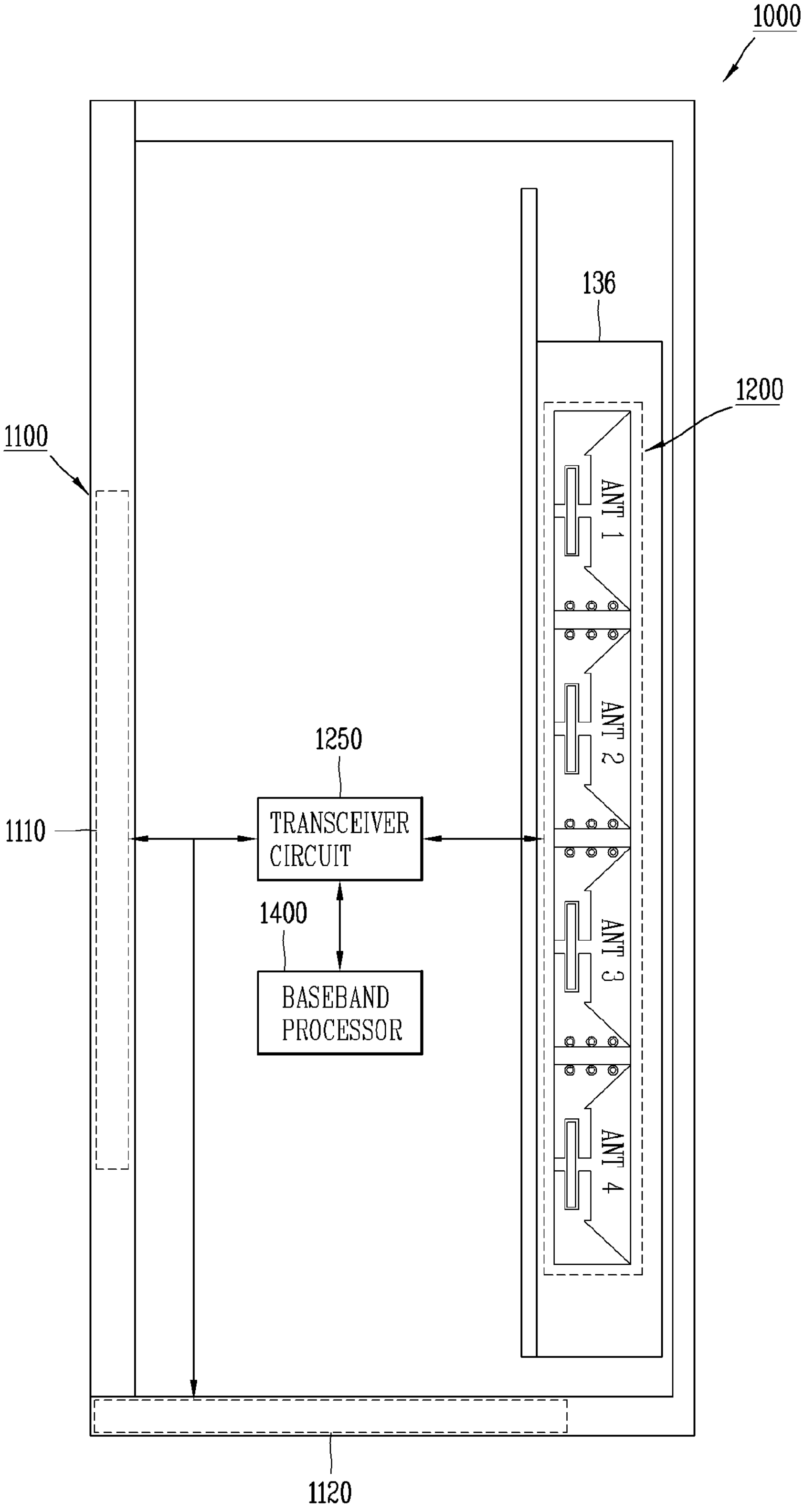
FIG. 13 is a view illustrating an electronic device including a plurality of antennas, a transceiver circuit, and a baseband processor according to the present disclosure.

FIG. 12 is a view illustrating an electronic device including antennas, a transceiver circuit, and a baseband processor according to the present disclosure. FIG. 13 is a view illustrating an electronic device including a plurality of antennas, a transceiver circuit, and a baseband processor according to the present disclosure.

Referring to FIGS. 1A to 13, the electronic device 1000 may include a first antenna 1100, a second antenna 1200, a transceiver circuit 1250, and a baseband processor 1400.

The first antenna 1100 may be disposed on the side surface of the electronic device to operate in a first band as an LTE band. On the other hand, the antenna 1200 according to the present disclosure may be the second antenna 1200 configured to operate in a second band, which is the 5G Sub 6 band. Here, the position of the first antenna 1100 may not be limited to that illustrated in FIG. 12 or 13, and may alternatively be in one region of the left, right, upper or lower portion of the electronic device. On the other hand, the second antenna 1200 may be configured as a single antenna as illustrated in FIG. 12 or a plurality of antennas fora MIMO operation as illustrated in FIG. 13.

The transceiver circuit 1250 may be connected to the feeding pattern 1220 to transmit signals to the first metal pattern 1211 and the second metal pattern 1212 through the feeding pattern 1220. In addition, the baseband processor 1400 may be connected to the transceiver circuit 1250 and control the transceiver circuit 1250 to transmit and receive signals through at least one of the first antenna 1100 and the second antenna 1200.

Specifically, the transceiver circuit 1250 may transmit and receive a first signal of a first band and transmit and receive a second signal of a second band. The baseband processor 1400 may control the transceiver circuit 1250 to receive the second signal through the second antenna 1200 when quality of the first signal is lower than or equal to a threshold. In an example, the baseband processor 1400 may perform carrier aggregation (CA) when a broadband transmission is requested and a broadband frequency is allocated. To this end, the baseband processor 1400 may perform CA by using the first signal of the first band received through the first antenna 1100 and the second signal of the second band received through the second antenna 1200.

On the other hand, the first antenna 1100 may be configured to transmit and receive signals of the LTE band. In this regard, the first antenna 1100 may be disposed on the side surface of the electronic device. For example, the first antenna 1100 may include one or more antennas **1100*a* and 1100*b*** disposed on the upper, lower, left, or right side of the electronic device.

Accordingly, the baseband processor 1400 corresponding to the modem may perform multiple-input/multi-output (MIMO) or diversity through the first antennas **1100*a*, 1100*b*. Here, the position and number of the first antennas 1100*a*, 1100*b* may not be limited thereto, but may vary depending on applications. The number of the first antennas 1100*a*, 1100*b*** may be increased up to 4 to support 4TX or 4RX.

Meanwhile, the first antennas **1100*a*, 1100*b* may operate in dual bands to operate in the 5G band as well as the LTE band. In this case, the baseband processor 1400 may perform MIMO using at least one of the first antennas 1100*a* and 1100*b* and at least one of the second antennas 1200**.

So far, the electronic device having the 5G antenna has been described. Hereinafter, technical effects of the electronic device having the 5G antenna, in particular, the electronic device having the antenna of the low-profile structure that can be disposed inside the electronic device will be described.

The present disclosure can provide an electronic device in which a low-profile antenna with a small size and a low height is disposed even in a full display structure.

The present invention can also provide a low-profile antenna that can be disposed inside an electronic device to be horizontal to a cover of the electronic device, so as to secure high antenna space utilization and arrangement freedom while optimizing wireless performance.

In particular, the low-profile antenna can be effectively designed to have a very low height of 0.02λ or lower, and can easily implement impedance matching.

In particular, the low-profile antenna may have a radiator with both end portions shorted, which can be advantageous in view of arranging plural antennas by virtue of miniaturization of antennas and improvement of isolation between antennas.

Further scope of applicability of the present disclosure will become apparent from the following detailed description. It should be understood, however, that the detailed description and specific examples, such as the preferred implementation of the invention, are given by way of illustration only, since various changes and modifications within the spirit and scope of the invention will be apparent to those skilled in the art.

In relation to the aforementioned present disclosure, the design of a low-profile antenna and the control of an antenna and a transceiver circuit by a controller such as a baseband processor can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180, 1250, 1400 of the terminal. Therefore, the detailed description should not be limitedly construed in all of the aspects, and should be understood to be illustrative. Therefore, all changes and modifications that fall within the metes and bounds of the claims, or equivalents of such metes and bounds are therefore intended to be embraced by the appended claims.

The invention claimed is:

1. An electronic device, comprising:

an antenna pattern formed on a first substrate; and a ground pattern formed on a second substrate disposed under the first substrate;

wherein the antenna pattern comprises:

a first metal pattern configured to be formed a metal having a length and width on an upper portion of the first substrate;

a second metal pattern spaced apart from the first metal pattern and formed as a metal having a length and width, wherein the first metal pattern and the second metal pattern include an inset region in which no metal pattern is formed;

a feeding pattern formed of a metal having a length and a width in the inset region and configured to feed a signal to be coupled to the first metal pattern and the second metal patterns; and a plurality of vias configured to connect the first metal pattern and the second metal pattern to the ground pattern at end portions thereof and spaced inwardly apart from each other in a widthwise direction of the first metal pattern and the second metal pattern, wherein each of the first metal pattern and the second metal pattern comprises:

a first radiation portion formed in a rectangular shape having a predetermined length and width, and having an inset region formed therein; and a second radiation portion connected to the first radiation portion and formed to be tapered at a predetermined angle to increase a width.

2. The electronic device of claim 1, further comprising a transceiver circuit connected to the feeding pattern and configured to transfer a signal to the first metal pattern and the second metal pattern through the feeding pattern.

3. The electronic device of claim 1, wherein a horizontal magnetic field current is generated in a horizontal plane with the first metal pattern and the second metal pattern in a boundary region between the feeding pattern and the inset region, and the horizontal magnetic field current causes a height of a substrate on which the antenna pattern is disposed to be reduced.

4. The electronic device of claim 1, wherein permittivity of the first substrate is set to a value greater than permittivity of the second substrate to increase efficiency of the antenna pattern and reduce a size of the antenna pattern.

5. The electronic device of claim 1, wherein the feeding pattern is disposed on the upper portion of the first substrate that is coplanar with the first metal pattern and the second metal pattern.

6. The electronic device of claim 1, wherein the feeding pattern is disposed on a lower portion of the first substrate or an upper portion of the second substrate that is a different plane from the first metal pattern and the second metal pattern.

7. The electronic device of claim 1, wherein the feeding pattern is disposed in the inset region inside the first radiation portion, and a position at which the feeding pattern is disposed is offset by a predetermined distance from an end portion in a widthwise direction of the first radiation portion.

8. The electronic device of claim 1, further comprising a carrier formed of a dielectric and disposed inside the electronic device, wherein the antenna pattern is disposed on a front surface of the carrier, and the first metal pattern and the second metal pattern are disposed in a longitudinal direction of the electronic device.

9. The electronic device of claim 1, wherein a width of an end portion of the second radiation portion is set to a value ranging from 8 to 12 mm in consideration of resonant frequency and radiation efficiency of the antenna pattern.

10. The electronic device of claim 1, wherein a difference between widths of the first radiation portion and the second radiation portion at a point where the first radiation portion and the second radiation portion are connected is set to a value ranging from 1 to 5 mm in consideration of impedance and resonant frequency of the antenna pattern.

11. The electronic device of claim 1, wherein a length of the feeding pattern is set to a value of 0.3 to 0.4 times a length from a terminated portion of the first metal pattern to a terminated portion of the second metal pattern in consideration of resonant frequency, bandwidth, and radiation efficiency of the antenna pattern.

12. The electronic device of claim 2, further comprising a first antenna disposed on a side surface of the electronic device and configured to operate in a first band as a long-term evolution (LTE) band, wherein the antenna pattern is a second antenna operating in a second band as a 5G Sub 6 band, and wherein the electronic device further comprises a baseband processor connected to the transceiver circuit and configured to control the transceiver circuit to transmit and receive signals through at least one of the first antenna and the second antenna.

13. The electronic device of claim 12, wherein the transceiver circuit is configured to transmit and receive a first signal of the first band and transmit and receive a second signal of the second band, and wherein the baseband processor is configured to, control the transceiver circuit to receive the second signal through the second antenna when quality of the first signal is lower than or equal to a threshold, and perform carrier aggregation (CA) by using the first signal of the first band received through the first antenna and the second signal of the second band received through the second antenna when broadband transmission is requested and a broadband frequency is allocated.

* * * * *